(12) United States Patent
Lalonde et al.

(10) Patent No.: US 10,406,687 B2
(45) Date of Patent: Sep. 10, 2019

(54) LAYERED MULTI-AGENT COORDINATION

(71) Applicant: X DEVELOPMENT LLC, Mountain View, CA (US)

(72) Inventors: Geoffrey Lalonde, Mountain View, CA (US); Peter Anderson-Sprecher, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 339 days.

(21) Appl. No.: 15/390,006

(22) Filed: Dec. 23, 2016

(65) Prior Publication Data
US 2018/0178382 A1 Jun. 28, 2018

(51) Int. Cl.
*G05B 19/04* (2006.01)
*G05B 19/18* (2006.01)
(Continued)

(52) U.S. Cl.
CPC .......... *B25J 9/1666* (2013.01); *G05D 1/0297* (2013.01); *G05D 2201/0216* (2013.01); *Y10S 901/01* (2013.01)

(58) Field of Classification Search
CPC ................ B25J 9/1666; G05D 1/0297; G05D 2201/0216; Y10S 901/01
See application file for complete search history.

(56) References Cited

U.S. PATENT DOCUMENTS 6,049,756 A   4/2000  Libby
7,447,593 B2 * 11/2008 Estkowski ............. G01C 21/20
                                                          700/250

(Continued)

FOREIGN PATENT DOCUMENTS

WO   WO02082195    10/2002
WO   2005/096114 A1   10/2015
WO   2016/122840 A1   1/2016

OTHER PUBLICATIONS

P. Abbeel, "Optimal Control for Linear Dynamical Systems and Quadratic Cost ('LQR')", Sep. 4, 2012, available via the Internet at people.eecs.berkeley.edu/~pabbeel/cs287-fa12/slides/LQR.pdf (last visited Oct. 27, 2016).

(Continued)

*Primary Examiner* — Harry Y Oh
(74) *Attorney, Agent, or Firm* — McDonnell Boehnen Hulbert & Berghoff LLP

(57) ABSTRACT

A method includes receiving first and second coordinated paths for first and second robotic devices. The first coordinated path comprises a dependency edge indicating a first position on the first coordinated path and a second position on the second coordinated path. The method also includes determining a first traversable portion extending to a first stopping position before or at the first position on the first coordinated path. The method also includes providing a first instruction to the first robotic device to traverse the first traversable portion; subsequently determining that the second robotic device has passed the second position on the second coordinated path; determining a second traversable portion of the first coordinated path extending to a second stopping position beyond the first position on the first coordinated path; and providing a second instruction to the first robotic device to traverse the second traversable portion.

17 Claims, 12 Drawing Sheets

(51) Int. Cl.
    *B25J 9/16*     (2006.01)
    *G05D 1/02*     (2006.01)

(56) References Cited

U.S. PATENT DOCUMENTS

| | | | |
|---|---|---|---|
| 7,974,737 B2 | 7/2011 | Tilove et al. | |
| 8,576,235 B1 | 11/2013 | Sumner et al. | |
| 8,630,762 B2 | 1/2014 | Staempfle et al. | |
| 8,948,959 B2 | 2/2015 | Maggi | |
| 8,972,056 B2 | 3/2015 | Petersen et al. | |
| 9,087,314 B2 * | 7/2015 | Hoffman | G06Q 10/087 |
| 9,740,212 B2 * | 8/2017 | D'Andrea | G05B 19/41895 |
| 2004/0068348 A1 * | 4/2004 | Jager | G05D 1/0295 700/255 |
| 2004/0122570 A1 * | 6/2004 | Sonoyama | G05D 1/0297 701/23 |
| 2005/0090933 A1 * | 4/2005 | Ebert | B25J 9/1694 700/245 |
| 2011/0093134 A1 * | 4/2011 | Emanuel | G05D 1/0289 701/2 |
| 2013/0325210 A1 * | 12/2013 | Palm | G05D 1/0289 701/2 |
| 2014/0032035 A1 * | 1/2014 | Thomson | G05D 1/0274 701/25 |
| 2014/0121833 A1 | 5/2014 | Lee et al. | |
| 2014/0172223 A1 * | 6/2014 | Murphy | G05D 1/0289 701/25 |
| 2014/0214469 A1 | 7/2014 | Callow et al. | |
| 2014/0277691 A1 * | 9/2014 | Jacobus | G06Q 10/087 700/216 |
| 2014/0350831 A1 * | 11/2014 | Hoffman | G06Q 10/00 701/117 |
| 2015/0234386 A1 | 8/2015 | Zini et al. | |
| 2015/0251315 A1 | 9/2015 | Brandenberger | |
| 2016/0129592 A1 * | 5/2016 | Saboo | G06Q 50/28 700/248 |
| 2016/0132059 A1 | 5/2016 | Mason et al. | |
| 2016/0176638 A1 * | 6/2016 | Toebes | G06Q 10/087 700/216 |
| 2016/0180713 A1 * | 6/2016 | Bernhardt | B66F 17/003 701/70 |
| 2017/0344009 A1 * | 11/2017 | Wernersbach | G05D 1/0011 |
| 2018/0210459 A1 * | 7/2018 | Wei | G05D 1/0289 |

OTHER PUBLICATIONS

M. H. Bowling et al., "Multiagent Planning in the Presence of Multiple Goals", Planning in Intelligent Systems: Aspects, Motivations, and Methods, Feb. 15, 2006, Chapter 10, available via the Internet at www.cs.cmu.edu/~mmv/papers/05planning.pdf (last visited Oct. 5, 2016).

V. Digani et al., "Ensemble Coordination Approach to Multi-AGV Systems Applied to Industrial Warehouses", IEEE Transactions on Automation Science and Engineering, vol. 12, No. 3, Jul. 2015, pp. 922-934.

D. Fox et al., "The Dynamic Window Approach to Collision Avoidance", Jun. 25, 1996, available via the Internet at www.ri.cmu.edu/pub_files/pub1/fox_dieter_1997_1/fox_dieter_1997_1.pdf (last visited Dec. 20, 2016).

R. M. Jensen et al., "ASET: a Multi-Agent Planning Language with Nondeterministic Durative Tasks for BDD-Based Fault Tolerant Planning", Apr. 20, 2005, available via the Internet at www.cs.cmu.edu/~mmv/papers/05icapsw-aset.pdf (last visited Dec. 20, 2016).

L. E. Kavraki et al., "Probabilistic Roadmaps for Path Planning in High-Dimensional Configuration Spaces", IEEE Transactions on Robotics and Automation, vol. 12, No. 4, Aug. 1996, pp. 566-570.

A. Majumdar et al., "Multi-Query Feedback Motion Planning with LQR-Roadmaps", Mar. 30, 2011, available via the Internet at groups.csail.mit.edu/robotics-center/public_papers/Majumdar11.pdf (last visited Dec. 20, 2016).

S. Saha et al., "Trajectory-Based Formal Controller Synthesis for Multi-Link Robots with Elastic Joints", Dec. 15, 2014, 2014 IEEE 53rd Annual Conference on Decision and Control (CDC).

D. Silver, "Cooperative Pathfinding", Nov. 14, 2015, Eleventh Annual AAAI Conference on Artificial Intelligence and Interactive Digital Entertainment.

J. M. V. Ventura, "Safe and flexible hybrid control architecture for the navigation in formation of a group of vehicles", Oct. 26, 2015, Ph.D. Thesis, Universite Blaise Pascal—Clermont-Ferrand II, Clermont-Ferrand, France.

Wikimedia Foundation, "Robotics/Navigation/Trajectory Planning", Nov. 4, 2016, available via the Internet at en.wikibooks.org/w/index.php?title=Robotics/Navigation/Trajectory_Planning&oldid=3142754 (last visited Dec. 20, 2016).

R. Yehoshua, "Sample based motion planning—Roadmaps and RRTs", Jan. 11, 2014, available via the Internet at u.cs.biu.ac.il/~yehoshr1/89-685/Fall2013/TheoryLessons/Lec9-Short.pdf (last visited Oct. 5, 2016).

J. Yu et al., "Planning Optimal Paths for Multiple Robots on Graphs", May 10, 2013, 2013 IEEE International Conference on Robotics and Automation (ICRA).

* cited by examiner

_US 10,406,687 B2_

LAYERED MULTI-AGENT COORDINATION

BACKGROUND

One or more robots and/or other actors, such as human actors, can move throughout a space, such as the interior of part or all of a building and/or its surrounding outdoor regions, to perform tasks and/or otherwise utilize the space together. One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robotic devices guided by computer control systems.

Mobile robotic devices can be used in a number of different environments to accomplish a variety of tasks. For example, mobile robotic devices can deliver items, such as parts or completed products, within indoor environments, such as warehouses, hospitals and/or data centers. When mobile robotic devices are deployed, they can use one or more possible paths to and from delivery and/or other locations. These paths can be determined using one or more route planning algorithms.

SUMMARY

The present application discloses implementations that relate to a layered multi agent planning framework for centralized coordination of agents moving within an environment. Coordinated path planning for agents can become increasingly time consuming and computationally complex for environments in which a large number of agents are used. Example embodiments disclosed herein may allow for simultaneous execution of paths by agents while updated paths are being determined. Still further, where one or more agents deviate from scheduled execution of their respective paths, example embodiments may allow agents to execute portions of their respective coordinated paths while updated paths are determined which take into account the deviations.

In one example, the present application describes method. The method involves receiving, by a computing device, first and second coordinated paths for respective first and second robotic devices, wherein the first coordinated path comprises a first dependency edge indicating a first position on the first coordinated path and a second position on the second coordinated path. The method also involves determining, by the computing device, a first traversable portion of the first coordinated path, wherein the first traversable portion extends to a first stopping position that is before or at the first position on the first coordinated path. The method further involves providing, by the computing device, a first instruction to the first robotic device to traverse the first traversable portion of the first coordinated path. The method also involves subsequently determining, by the computing device, that the second robotic device has passed the second position on the second coordinated path. The method still further involves determining, by the computing device, a second traversable portion of the first coordinated path, wherein the second traversable portion extends to a second stopping position that is beyond the first position on the first coordinated path. And the method yet further involves providing, by the computing device, a second instruction to the first robotic device to traverse the second traversable portion of the first coordinated path.

In a second example, a system is described. The system includes a first robotic device and a second robotic device. The system also includes a computing device, wherein the computing device is configured for receiving first and second coordinated paths for the respective first and second robotic devices, wherein the first coordinated path comprises a first dependency edge indicating a first position on the first coordinated path and a second position on the second coordinated path. The computing device is also configured for determining a first traversable portion of the first coordinated path, wherein the first traversable portion extends to a first stopping position that is before or at the first position on the first coordinated path. The computing device is further configured for providing a first instruction to the first robotic device to traverse the first traversable portion of the first coordinated path. The computing device is further configured for subsequently determining that the second robotic device has passed the second position on the second coordinated path. The computing device is still further configured for determining a second traversable portion of the first coordinated path, wherein the second traversable portion extends to a second stopping position that is beyond the first position on the first coordinated path. And the computing device is yet further configured for providing a second instruction to the first robotic device to traverse the second traversable portion of the first coordinated path.

In a third example, a non-transitory computer-readable medium is described. The non-transitory computer-readable medium has instructions stored thereon that, when executed, cause performance of a set of acts. The set of acts includes receiving first and second coordinated paths for respective first and second robotic devices, wherein the first coordinated path comprises a first dependency edge indicating a first position on the first coordinated path and a second position on the second coordinated path. The set of acts also include determining a first traversable portion of the first coordinated path, wherein the first traversable portion extends to a first stopping position that is before or at the first position on the first coordinated path. The set of acts further includes providing a first instruction to the first robotic device to traverse the first traversable portion of the first coordinated path. The set of acts still further includes subsequently determining that the second robotic device has passed the second position on the second coordinated path. The set of acts yet further includes determining a second traversable portion of the first coordinated path, wherein the second traversable portion extends to a second stopping position that is beyond the first position on the first coordinated path. And the set of acts further includes providing a second instruction to the first robotic device to traverse the second traversable portion of the first coordinated path.

In another example, a control system is described. The control system includes means for receiving first and second coordinated paths for respective first and second robotic devices, wherein the first coordinated path comprises a first dependency edge indicating a first position on the first coordinated path and a second position on the second coordinated path. The control system also includes means for determining a first traversable portion of the first coordinated path, wherein the first traversable portion extends to a first stopping position that is before or at the first position on the first coordinated path. The control system also includes means for providing a first instruction to the first robotic device to traverse the first traversable portion of the first coordinated path. The control system also includes means for subsequently determining that the second robotic device has passed the second position on the second coordinated path. The control system also includes means for determining a second traversable portion of the first coordinated path, wherein the second traversable portion extends to a second stopping position that is beyond the first position on the first coordinated path. And the control system also includes means for providing a second instruction to the first robotic device to traverse the second traversable portion of the first coordinated path.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
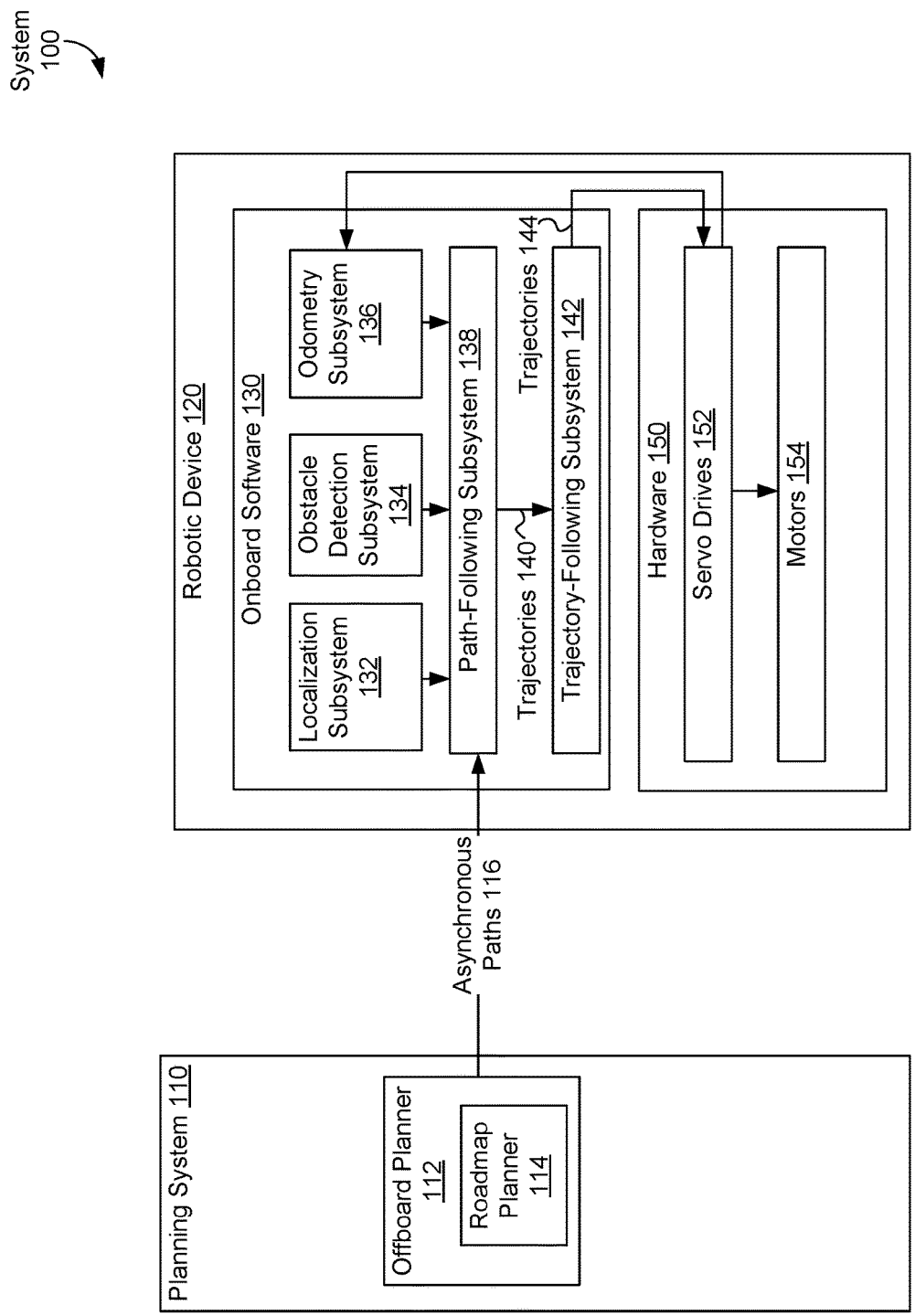
FIG. 1 is a block diagram of a system, in accordance with an example embodiment

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. Overview

Robotic navigation in an environment such as a warehouse can allow autonomous robotic devices the ability to carry out one or more actions without the need for constant human control. In an environment having multiple robotic devices, the movements of the robotic devices may be coordinated with each other such that they do not run into each other or objects in the environment, for example. When a robotic device is given a task, it may thus also be given a corresponding coordinated path, that may include the scheduled locations, timing, speed, orientation of the robotic device, and/or other information pertaining to the robotic device so that it can carry out the task.

In some examples, multiple robotic devices may be given tasks to carry out in the same environment at the same time, or for some overlapping amount of time. There may be multiple robotic devices moving throughout the environment at the same time, and each robotic device may be given a respective coordinated path to follow. And further, the coordinated paths may be designed, generated, or otherwise selected such that for any point in time, no two robotic devices will occupy the same location. When multiple robotic devices are moving within the environment, a first robotic device may have to wait for a second robotic device to reach a selected location before the first robotic device moves. This may occur, for instance, at or near an intersection in the environment, where many coordinated paths cross.

At or near this intersection, for example, one or more of the coordinated paths may include a dependency edge, indicating a first position on a first coordinated path and a second position on a second path. Dependency edges may be predetermined, generated, or selected by a planning system, and may correspond to example coordinated paths. In one example, a dependency edge may be associated with the intersection described above, and a first robotic device may be scheduled to wait on a first north-south component of the intersection for a second robotic device to cross along the east-west component. The first robotic device may then proceed once the second robotic device has crossed and is out of the way.

A first coordinated path of a first robotic device may include scheduled positions and times for which the first robotic device should be located in the scheduled positions. As such, the coordinated path may be an idealized path. However in practice the first robotic device may not be able to follow the first coordinated path exactly, and may be off from the scheduled positions and/or times. The first robotic device may run into an unexpected obstacle, may be slower than anticipated, or may have some other aspect that results in an execution of the first coordinated path that differs from the scheduled execution.

Coordinated paths may be selected for multiple robotic devices under the assumption that each robotic device will stick to the scheduled execution of their respective coordinated path, with some additional buffer. However, should a robotic device's execution differ from the scheduled execution, one or more other coordinated paths (and corresponding robotic devices) may be impacted. For instance, suppose the coordinated paths for two robotic devices include a part in which a first robotic device reaches a designated position at a first time $t_0$ and a second robotic device reaches the same designated position at a time $t_1$ that is scheduled to be 5 seconds after $t_0$. If the first robotic device is unexpectedly delayed by 5 seconds, there may be a collision at the designated position.

Instead of merely causing one robotic device to wait for a delayed robotic device to catch up, some delays or differences between the scheduled execution of a coordinated path and the in-practice execution of the coordinated path may merit re-planning, or generating new coordinated paths for one or more of the robotic devices. But the number of robotic devices and complexity of the environment may cause this re-planning to take a relatively long amount of time. Thus, it may be useful to control the robotic devices to carry out as much of the current coordinated paths as possible (without a collision), while new coordinated paths are generated.

With these concepts in mind, an example method disclosed herein may involve receiving, by a computing device, first and second coordinated paths for respective first and second robotic devices, wherein the first coordinated path comprises a first dependency edge indicating a first position on the first coordinated path and a second position on the second coordinated path. The first and second positions may be at or near an intersection in the environment, for example. The computing device may then determine a first traversable portion of the first coordinated path, wherein the first traversable portion extends to a first stopping position that is before or at the first position on the first coordinated path. The first traversable portion may have a starting position that is the current or scheduled position of the first robotic device. And the ending position of the first traversable portion may be limited by some maximum limit, such as a time limit (e.g., 5 seconds) or a distance limit (e.g., 5 meters). This limit may prevent a robotic device from continuing movement should communication with a controller be interrupted.

The computing device may then provide a first instruction to the first robotic device to traverse the first traversable portion of the first coordinated path. The computing device may then subsequently determine that the second robotic device has passed the second position on the second coordinated path. The method may then involve the computing device determining a second traversable portion of the first coordinated path, wherein the second traversable portion extends to a second stopping position that is beyond the first position on the first coordinated path, and providing, by the computing device, a second instruction to the first robotic device to traverse the second traversable portion of the first coordinated path.

In some examples, methods disclosed herein may further include determining that the first robotic device is behind schedule by more than a threshold amount, and responsively requesting updated coordinated paths. Further, after requesting a new coordinated path but before receiving the new coordinated path, multiple instructions to traverse multiple traversable portions may be sent to a robotic device. For instance, a robotic device may detect that a collision may occur in the future, and a new coordinated path avoiding the collision may be requested. However, while the new coordinated path is being determined, the robotic device may continue to carry out the old coordinated path via a plurality of instructions to carry out traversable portions of the old coordinated path. This may provide time for a central planning system to generate or select a new set of coordinated paths that do not conflict. And while the central planning system is generating those new paths, the robotic devices may each receive a plurality of instructions allowing them to carry out as much of their current coordinated paths as possible before the central planning system finished generating the new, non-conflicting coordinated paths. As such, instead of requiring the robotic devices to stop and wait while new coordinated paths are generated, example embodiments herein may allow the robotic devices to continue execution of their soon-to-be out of date coordinated paths during the time when up to date coordinated paths are being generated.

In some examples, a coordinated path may include a plurality of dependency edges, and the first traversable portion may be limited by the next unsatisfied dependency edge. For instance, the first coordinated path may include three dependency edges at different times and locations along the first coordinated path. The dependency edge used to determine the first traversable portion may be the next unsatisfied dependency, which may be the next dependency edge that is scheduled to be reached by the first robotic device based on a current position or time.

II. Example System Design

FIG. 1 is a block diagram of system 100, in accordance with an example embodiment. System 100 includes planning system 110 and robotic device 120. Planning system 110 can include offboard planner 112 that can coordinate motion of one or more robotic devices operating in an environment. Offboard planner 112 can include roadmap planner 114. Offboard planner 112 and/or roadmap planner 114 can generate one or more asynchronous paths 116 for a robotic device, such as robotic device 120, to follow while operating in an environment.

A roadmap graph, prototype graph, or other roadmap representing an environment, such as prototype graph 300 discussed below in the context of FIG. 3, can be received, determined, or otherwise provided to planning system 110, offboard planner 112 and/or roadmap planner 114. Asynchronous paths 116 can be one or more paths based on the roadmap graph, prototype graph, or other roadmap. For example, if the roadmap graph, prototype graph, or other roadmap has a plurality of edges that connect a plurality of intersections, asynchronous paths 116 can be specified in terms of the plurality of edges and/or the plurality of intersections.

Robotic device(s) 120 can include onboard software 130 and/or hardware 150. Onboard software 130 can include one or more of: localization subsystem 132, obstacle detection subsystem 134, odometry subsystem 136, path-following subsystem 138, and trajectory-following subsystem 142. Localization subsystem 132 can be used to localize a robotic device, that is, determine a location of the robotic device within an environment. Localization subsystem 132 can generate position estimates of the robotic device and/or other objects that can be used to localize the robotic device, assist the robotic device in following a path, such as asynchronous paths 116, and/or assist the robotic device in following a trajectory, such as trajectories 140. Once the position estimates are generated, localization subsystem 132 can provide the position estimates to path-following subsystem 138.

An asynchronous path, or path for short, can be a time-invariant plan or other information indicating how robotic device 120 can travel from a starting point SP to an ending point EP; i.e., an (asynchronous) path does not take time into account. In contrast, a trajectory can include values of a steering angle and of traction motor velocity that robotic device 120 can follow for a planning time interval.

The planning time interval can be a duration of time that a robotic device is guided, or planned to follow a path, route, and/or travel. In some embodiments, the planning time can be a predetermined amount of time; e.g., five seconds, one second, 0.2 seconds, or 0.1 seconds. For example, a predetermined planning time interval can be determined based on a user input that specifies a value for the planning time interval. In other embodiments, the planning time interval can be determined based on one or more other values; e.g., a stitch time, a time associated with a uniform edge (or path) cost, an estimated time to travel along a trajectory. Other techniques for determining the planning time interval and values for the planning time interval are possible as well.

Then, one or more trajectories can be used to describe how robotic device 120 can travel from starting point SP to an ending point EP in a time-variant manner. In some embodiments, a trajectory can also provide information about values of other variables than a steering angle and a traction motor velocity over the planning time interval, such as, but not limited to, other kinematic variables (e.g., velocity and acceleration) of robotic device 120, and actuator positions of robotic device 120.

As an example, a path to drive a car from a location "home" to a location "work" may include an ordered listing of streets that a control entity, such as a person or control device of an autonomous vehicle, can use to drive the car from home to work. In this example, a trajectory from home to work can involve one or more instructions specifying velocity and/or acceleration that the control entity can use to drive the car from home to work. In some examples, the trajectory can take traffic, obstacles, weather, and other time-sensitive conditions into account; e.g., the trajectory to go from home to work can indicate that the control entity "turn right for 10 seconds at 20 MPH or less", "accelerate to 55 MPH and drive straight for 3 minutes", "slow to 20 MPH within 30 seconds", "turn left for 10 seconds at 20 MPH or less", etc. In some embodiments, the trajectory can be changed along the way; e.g., to account for obstacles, changes in path, etc.

Obstacle detection subsystem 134 can determine whether one or more obstacles are blocking a path and/or a trajectory of robotic device 120. Examples of these obstacles can include, but are not limited to, pallets, objects that may have fallen off a pallet, robotic devices, and human operators working in the environment. If an obstacle is detected, obstacle detection subsystem 134 can provide one or more communications indicating obstacle detection to path-following subsystem 138. The one or more communications indicating obstacle detection can include location information about one or more positions of one or more obstacles detected by obstacle detection subsystem 134 and/or identification information about the one or more obstacles detected by obstacle detection subsystem 134. Odometry subsystem 136 can use data, such as data from servo drives 152, to estimate one or more changes in position of robotic device 120 over time.

Path-following subsystem 138 and/or trajectory-following subsystem 142 can act as a planner aboard robotic device 120. This onboard planner can follow one or more paths, such as asynchronous paths 116, based on position estimates provided by localization subsystem 132.

Path-following subsystem 138 can receive asynchronous paths 116, position estimate inputs from localization subsystem 132, location information about one or more positions of one or more obstacles from obstacle detection subsystem 134, and/or information about one or more changes in position from odometry subsystem 136, and generate one or more trajectories 140 as outputs.

Hardware 150 can include servo drives 152 and/or motors 154. Servo drives 152 can include one or more servo drives. Servo drives 152 can include an electronic amplifier used to power one or more servomechanisms and/or can monitor feedback signals from the servomechanism(s). Servo drives 152 can receive control signals, such as trajectories 144, from onboard software 130, and can provide electric current to the servomechanism(s) to produce motion proportional to the control signals. In some embodiments, servo drives 152 can compare status information received from the servomechanism(s) with an expected status as commanded by trajectories 144. Then, servo drives 152 can adjust a voltage frequency or pulse width of the provided electric current to correct for deviations between received status information and an expected status. In other embodiments, servo drives 152 can provide information, such as the feedback signals and/or location-related information, to onboard software 130.

One or more motors 154 can be part or all of the servomechanism(s) powered by servo drives 152. For example, motors 154 can use the electric current provided by servo drives 152 to generate mechanical force to drive part or all of robotic device 120; e.g., motors 154 can provide force to propel robotic device 120 and/or drive one or more effectors of robotic device 120.

Path planning of robotic devices within an environment, such as an environment that includes indoor settings, such as a warehouse, office building, or home, and/or outdoor settings, such as a park, parking lot, or yard, can be performed with respect to a roadmap graph, which is a connected graph of paths that agents, such as robotic devices, may follow. Using roadmap graphs to plan agent routing within the environment rather than taking a free-space approach can reduce a total planning state space and so making large-scale multi agent coordination tractable. Further, the use of roadmap graphs can enable operators to intuitively control areas in which robotic devices are allowed to navigate.

Roadmap graph generation can first involve generation of a prototype graph, which indicates the rough position of lanes and directions of travel. In some examples, a prototype graph can be a directed graph that indicates lanes and directions of travel of robotic devices. In other examples, a prototype graph can be generated manually based on a map or drawing of the environment.

Figure 2:
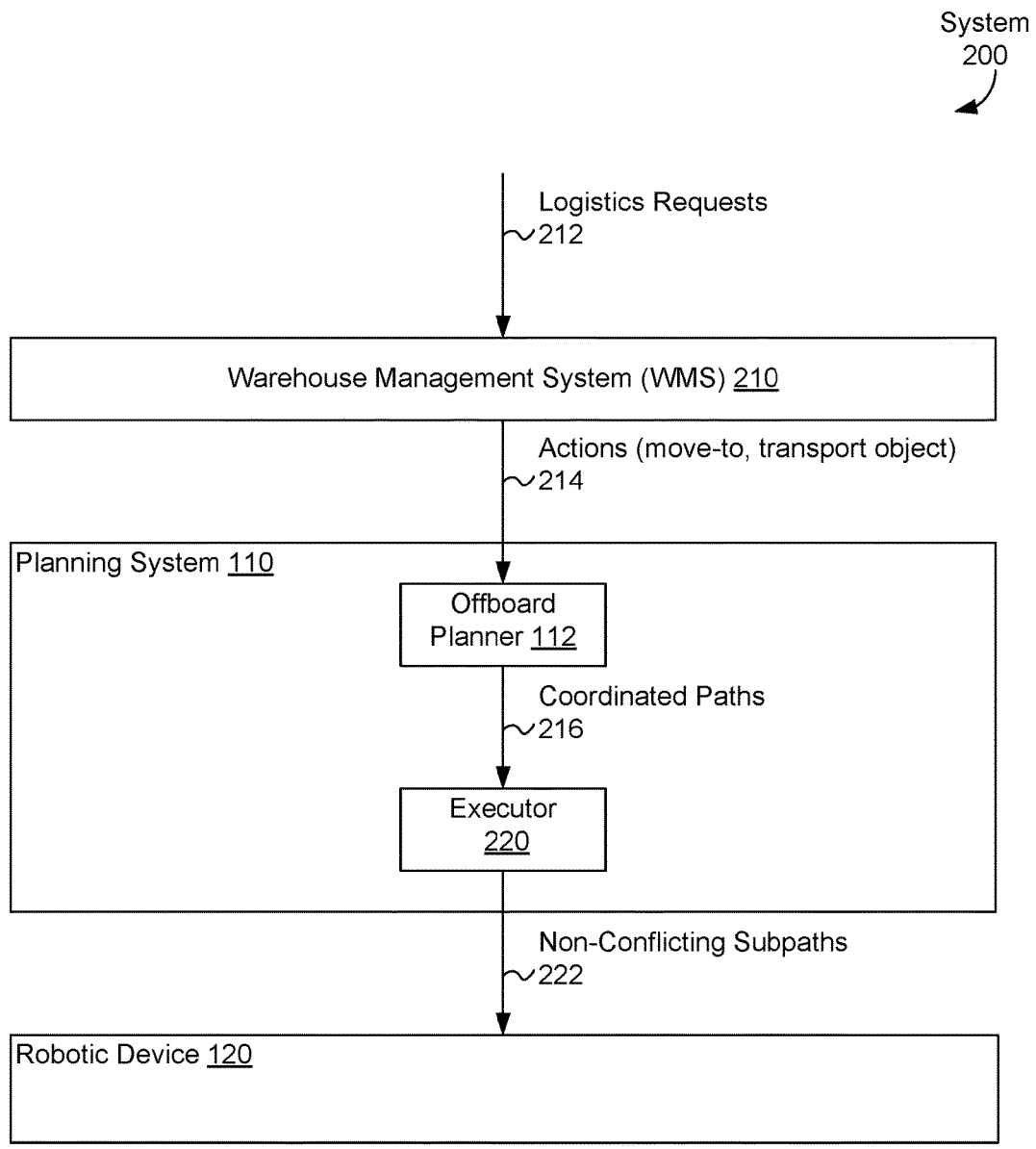
FIG. 2 depicts a system for operating one or more warehouses, in accordance with an example embodiment.

FIG. 2 depicts system 200 for operating one or more warehouses, in accordance with an example embodiment. System 200 includes warehouse management system 210, planning system 110, and robotic device 120. Warehouse management system 210 can receive one or more logistics requests 212 associated with the warehouse; e.g., requests to store one or more items in the warehouse and/or requests to ship one or more items from the warehouse. Warehouse management system 210 can translate logistics requests 212 into one or more actions 214, where actions 214 can include, but are not limited to, a "move-to" action to move one or more designated agents to one or more designated locations, and a "transport" action to carry one or more items to one or more designated locations. In some examples, actions 214 can be go-to commands of the form {agent ID, destination}, but other actions are possible such as move pallet. These are typically decomposable into move-to commands, however (move to pick location, move to place location).

Planning system 110 includes offboard planner 112 and executor 220. Offboard planner 112 can receive actions 214 as inputs and generate one or more coordinated paths 216 for one or more agents operating in a warehouse; e.g., multiple robotic devices, to carry out actions 214. Coordinated paths 216 can be part of a coordinated action plan for all agents in the warehouse to fulfill logistics requests 212. The coordinated action plan can take precedence of agents into account; e.g., if robotic devices RD1 and RD2 are both expected to reach a point at approximately the same time, one of the robotic devices can have precedence or priority over the other, such as robotic device RD1 waiting for robotic device RD2 to pass through the point (or vice versa). Executor 220 can receive coordinated paths 216 and generate non-conflicting sub-paths 222 to direct robotic device 120 in accomplishing its part of the coordinated action plan to carry out actions 214 to fulfill logistics requests 212.

As illustrated above in FIG. 2, planning system 110, which includes offboard planner 112 and executor 220, can communicate with robotic device 120. In some embodiments, the robotic device can be a fork truck, such as any OSHA class 1 or class 3 powered industrial truck. In other embodiments, planning system 110 can include software that executes using one or more networked computing devices located in the "cloud" (e.g., one or more networked computing devices) and/or located somewhere on a premises co-located with robotic device 120.

In some embodiments, offboard planner 112 and executor 220 can be synchronized. In an example embodiment, offboard planner 112 and executor 220 can be implemented on one device; e.g., in planning system 110 or robotic device 120, and synchronized within the device. In another example embodiment, offboard planner 112 and executor 220 can act synchronously in one or more devices.

Figure 3:
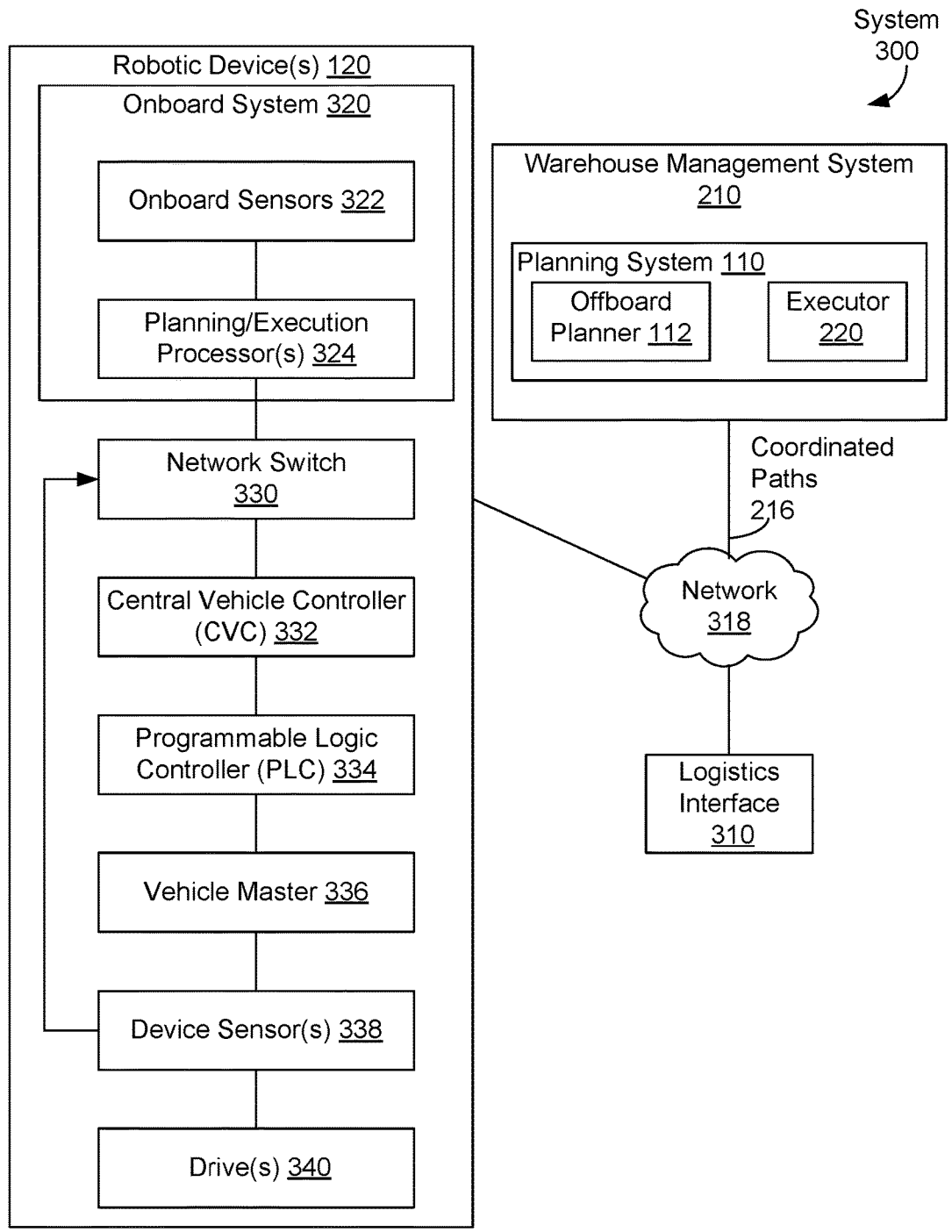
FIG. 3 illustrates a system, in accordance with an example embodiment.

FIG. 3 illustrates a system 300 that includes logistics interface 310, warehouse management system 210, and one or more robotic devices 120 connected using network 318, in accordance with an example embodiment. Logistics interface 310 can provide inventory task instructions to warehouse management system 210 via network 318 regarding movement of objects, such as pallets, and/or robotic devices to warehouse management system 210. An example inventory task can be to bring pallet A containing items of type B to location C.

Warehouse management system 210 can receive the inventory task instructions from logistics interface 310 and generate one or more task/mission instructions (e.g., an instruction to robotic device A to move pallet B from location C to location D) and/or plans for controlling robotic device(s) 120 to carry out the inventory task instructions. The task/mission instructions and/or plans can include information about one or more paths and/or one or more trajectories, where the task/mission instruction(s), plan(s), path(s) and trajectory/trajectories are generated by planning system 110 of warehouse management system 210 using the techniques discussed in the context of FIGS. 1, 2, and 6-7

For example, warehouse management system 210 can be a centralized control service running on and storing data using one or more computing devices; e.g., server computing devices. To perform these tasks, warehouse management system 210 can include WMS middleware and can provide a user interface to provide access to tools for monitoring and managing system 300. The WMS middleware and/or other components of warehouse management system 210 can use one or more application programming interfaces (APIs), such as protocol conversion APIs for conversion between task/mission instructions (e.g., an instruction to robotic device A to move pallet B from location C to location D) to robotic device paths, poses, and/or trajectories; conversion between inventory tasks and task/mission instructions; and conversions between APIs.

The user interface provided by warehouse management system 210 can provide one or more user interface functions for system 300, including, but not limited to: monitoring of robotic device(s) 120, e.g, presenting data related to location, battery status, state of charge, etc. of one or more robotic devices; enabling generation and sending of inventory task instruction(s), task/mission instruction(s), plan(s), path(s) and/or trajectory/trajectories to one or more of robotic device(s) 120; and reviewing, updating, deletion, and/or insertion of data related to one or more warehouse maps, pallets, networks, and/or planning systems (e.g., planning system 110, warehouse management system 210, and/or logistics interface 310).

In some embodiments, warehouse management system 210 can route communications between logistics interface 310 and robotic device(s) 120 and between two or more of robotic device(s) 120 and manage one or more onboard systems, such as onboard system 320 aboard one or more of robotic device(s) 120. In other embodiments, warehouse management system 210 can store, generate, read, write, update, and/or delete data related to system 300, such as, but not limited to: data regarding completion of a task/mission instruction by one or more of robotic device(s) 120; data regarding locations and/or poses of some or all of robotic device(s) 120, including data indicating a location where a robotic device was initialized/booted; data related to one or more audit trails for human actions, incident analysis, and/or debugging; and data for state tracking. In other embodiments, warehouse management system 210 can include a central message router/persistence manager that communicates with robotic device(s) 120 and one or more adapters. Each of the one or more adapters can provide access to data and/or communications of system 300 available to warehouse management system 210, and can include, but are not limited, to: a user interface service adapter for the above-mentioned user interface, a web content service adapter enabling World Wide Web (WWW)/Internet access to information about system 300, a message proxy adapter and/or a WMS adapter to act as intermediaries between communications between APIs and/or the WMS.

FIG. 3 shows that each of the one or more robotic devices 120 can include one or more of: onboard system 320, network switch 330, vehicle controller 332, programmable logic controller (PLC) 334, one or more device sensors 338, and one or more drives 340.

Onboard system 320 can be a computation and sensor package for robotic planning configured for installation into and use with robotic device 120, where onboard system 320 can include onboard sensors 322 and one or more planning/execution processors 324. FIG. 3 also shows that onboard system 320 is configured to use network switch 330 at least to communicate with planning system 110 (via network 318), with device sensors 338, and/or with one or more actuators of robotic device 120.

Onboard system 320 can be responsible for one or more of: localization of robotic device 120, generation of local trajectories to carry out plans and/or travel along paths and/or trajectories provided by warehouse management system 210, generation of commands to drives 340 to follow one or more (local) trajectories, generation of commands to control actuator(s) of robotic device 120, and reporting pose, status and/or other information to warehouse management system 210.

Onboard sensors 322 can include one or more navigation lasers, laser scanners, cameras, and/or other sensors for navigating and/or controlling onboard system 320. For example, a robotic device of robotic device(s) 120 can include one or more laser scanners, such as one or more laser scanners provided by SICK AG of Waldkirch, Germany, HOKUYO AUTOMATIC CO. LTD of Osaka, Japan, or KEYENCE CORPORATION of Osaka, Japan. The laser scanners can be used for obstacle detection and/or avoidance along a direction of travel of the robotic device as well as along the sides, corners, and/or back of the robotic device. The laser scanners can also be used to localize the robotic device using reflector-based localization. In some embodiments, cameras and/or other sensors can be used for obstacle detection, obstacle avoidance, and/or localization instead of or along with the laser scanners.

Planning/execution processor(s) 324 can include one or more computer processors connected at least to onboard sensors 322. Planning/execution processor(s) 324 can read data from onboard sensors 322, generate local trajectories and/or commands to drive(s) 340 to move robotic device 120, and communicate with warehouse management system 210. A local trajectory can be a trajectory where robotic device 120 starts at a starting pose and reaches an ending pose at some time. In some examples, the starting pose can be implicitly specified; e.g., the starting pose can be a current pose of robotic device 120 and so the local trajectory be based on an assumption that its starting pose is the current pose of robotic device 120.

Planning/execution processor(s) 324 can utilize a component framework. The component framework can be a multi-threaded job scheduling and message passing system built on software libraries for input/output (I/O) and signaling configured to provide a consistent asynchronous model of robotic device 120, such as the "boost::asio" and "boost::signals2" software libraries provided by boost.org of Onancock, Va. The component framework can enable communication between software components (or modules) so that the software components can be executed in parallel in a thread safe manner.

The component framework can include one or more of: a state machine component, a localization component, a planning component, and a trajectory following component. The state machine component can manage a state of robotic device 120 for vehicle initialization, vehicle commanding and fault handling. The state machine component can use a deterministic finite automaton or other state machine to manage the state of the robotic device.

The localization component can read data from vehicle sensors and integrate prior state information of robotic device 120 to determine a pose of robotic device 120. The pose can be determined relative to one or more detected landmarks/points of interest, such as pallets or other objects. The planning component can receive one or more objectives from warehouse management system 210 and determine a local trajectory for robotic device 120 to achieve those objectives. In some embodiments, the local trajectory can be a short-term trajectory that robotic device 120 is to follow for a predetermined amount of time; e.g., 100 milliseconds, 200 milliseconds, 500 milliseconds, 1 second, 5 seconds. The trajectory following component can receive the local trajectory generated by the planning component, and generate drive control instructions to travel along the local trajectory. The drive control instructions that are then relayed to drives 340 that control a traction motor and other actuators for robotic device 120.

Network switch 330 can enable communications for robotic device(s) 120. These communications can include, but are not limited to, communications between onboard system 320 and the rest of robotic device 120; e.g, device sensors 338 and drives 340, and communications with warehouse management system 210 via network 318. For example, network switch 330 can enable Transmission Control Protocol/Internet Protocol (TCP/IP)-based communications over Ethernet and/or other wireline communications interface(s) to a wireline network and/or over Wi-Fi™ and/or other wireless communications interface(s) to a wireless network, such as a PLANET Ethernet Switch by PLANET Technology Corporation of New Taipei City, Taiwan.

In some embodiments, communications between robotic device(s) 120 and planning system 110 can include remote procedure calls (RPCs). The remote procedure calls can allow invocation of software procedures, methods, and/or functions resident on one or more of robotic device(s) 120 by software of planning system 110 and vice versa. The remote procedure calls can be based on a communications protocol, such as TCP/IP, a HyperText Transfer Protocol (HTTP) such as HTTP 1.0 and/or HTTP 2.0, and/or another communications protocol. Some or all of the remote procedure calls can include encrypted data; such data may be encrypted using the Secure Sockets Layer (SSL), Transport Layer Security (TLS), and/or one or more other encryption algorithms and/or protocols. In embodiments where encrypted data is used, one or more certification authorities, such as a private certification authority, can authenticate one or more certificates used in encrypting and/or decrypting the encrypted data. A certificate authority can use an access control list (ACL) to control access to the one or more certificates. The remote procedure calls can use a request/response protocol and/or a bidirectional streaming protocol for RPC-related communications. In embodiments where the bidirectional streaming protocol is used for RPC-related communications, a single long-lived RPC can be used to implement the bidirectional streaming protocol.

Vehicle controller 332 and/or programmable logic controller 334 can provide electrical and sensor management functionality for robotic device(s) 120. The electrical and sensor management functionality can include, but is not limited to, functionality for electrical load control, lighting control, sensor control, sensor and/or switch signal processing, and power management. Vehicle master 336 can provide functionality for controlling one or more actuators, such as lift devices, of robotic device(s) 320.

Device sensor(s) 338 can include one or more sensors that can provide data related to controlling and/or operating robotic device(s) 120. The data can provide information about an environment about robotic device(s) 120, such as but not limited to, localization information, position estimates, and mapping data. For example, device sensor(s) 338 can include one or more lasers (e.g., two-dimensional (2D) lasers, safety lasers, laser scanners), cameras (e.g., Time-of-Flight (ToF) cameras, Red-Green-Blue (RGB) cameras, thermal cameras), electrical sensors, proximity sensors, navigational devices, and location sensors.

Drive(s) 340 can include one or more drive controllers and/or actuators that provide functionality for moving robotic device(s) 120. The drive controllers can direct the drive actuators to control movement of robotic device(s) 120. The drive actuators can include one or more traction motors, electric drives, hydraulic drives, and pneumatic drives.

Figure 4:
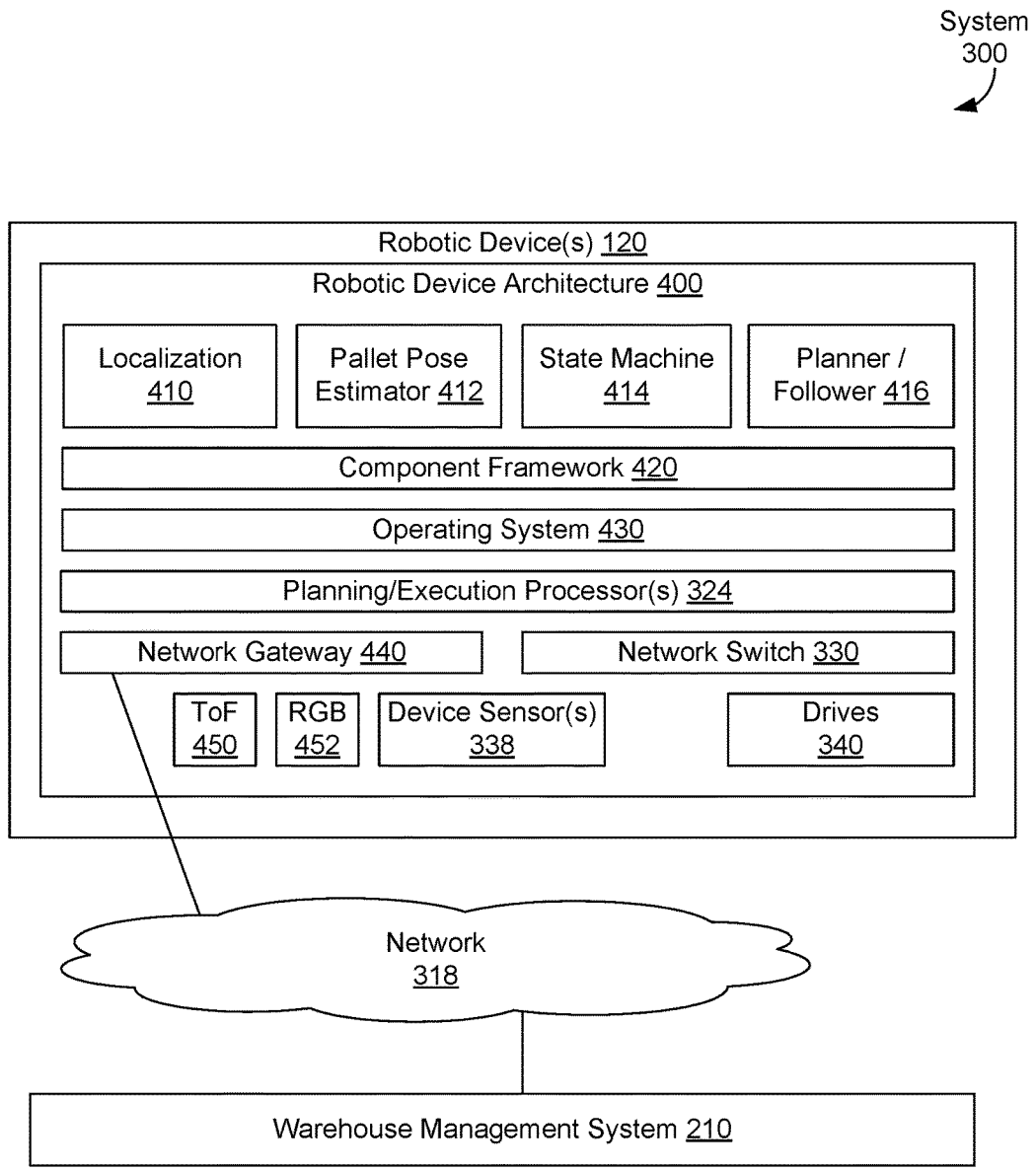
FIG. 4 illustrates a robotic device architecture for one or more robotic devices, in accordance with an example embodiment.

FIG. 4 illustrates robotic device architecture 400 of robotic device(s) 120, in accordance with an example embodiment. Robotic device architecture 400 of robotic device(s) 120 can include software. The software can include software for localization 410, software for a pallet pose estimator 412, software related to state machine 414, software for planner follower 416, software for component framework 420 and software for operating system 430. The software can be executed by one or more hardware planning/execution processors 324. Communications between robotic device(s) 120 and other devices can be carried out using network gateway 440 and/or network switch 330. For example, network gateway 440 can be used for wireless communications with and within a robotic device of robotic device(s) 120 and network switch 330 can be used for wireline communications with and within a robotic device of robotic device(s) 120. Robotic device architecture 400 also includes additional hardware such as device sensor(s) 338 and drive(s) 340 discussed above in the context of FIG. 3. In some embodiments, robotic device architecture 400 can include one or more cameras, including but not limited to, ToF camera 450 and RGB camera 452, where the one or more cameras can include one or more still cameras and/or one or more video cameras.

Figure 5:
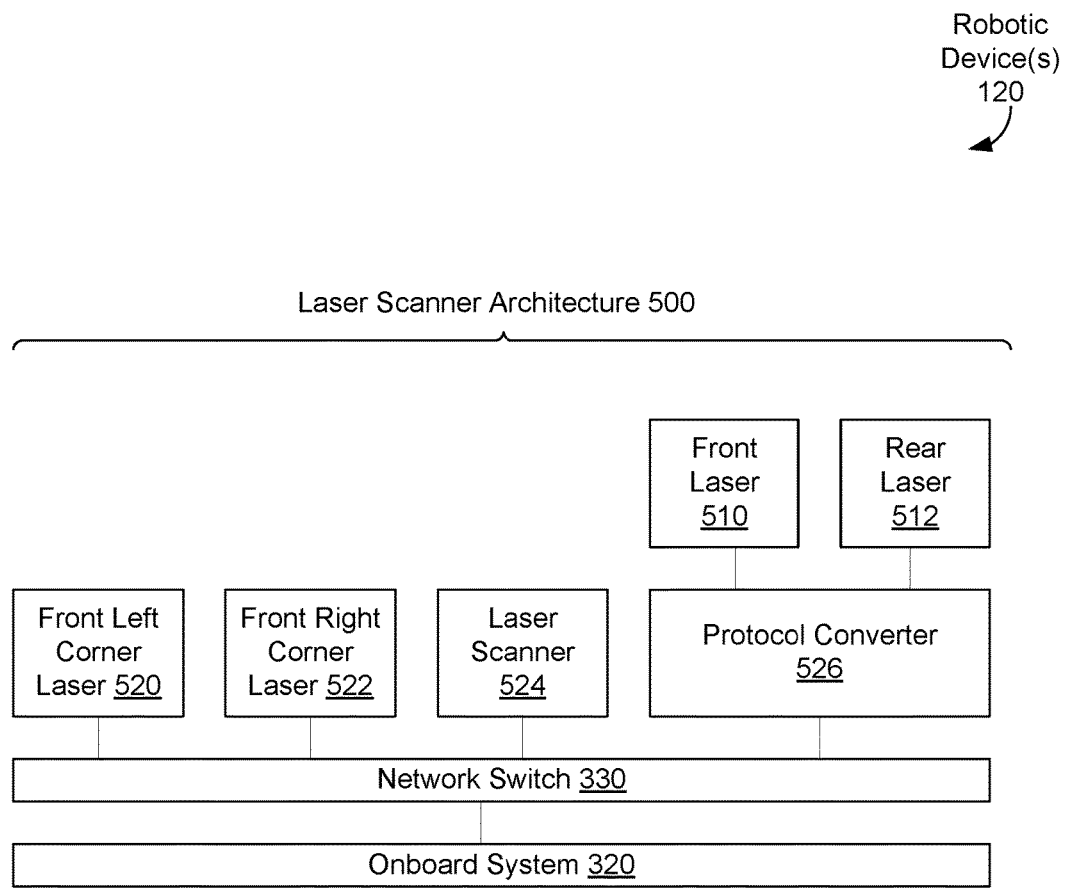
FIG. 5 illustrates a laser scanner architecture for one or more robotic devices, in accordance with an example embodiment.

FIG. 5 illustrates laser scanner architecture 500 for robotic device(s) 120, in accordance with an example embodiment. In some embodiments, some or all of device sensor(s) 338 can be lasers and laser scanners illustrated by laser scanner architecture 500.

Laser scanner architecture 500 can include lasers 510, 512, 520, 522, laser scanner 524, protocol converter 526, network switch 330, and onboard system 320. Lasers 510, 512, 520, and 522 can be located at fixed positions of robotic device(s) 120; for example, laser 510 can be located at the front of a robotic device, laser 512 can be located at the rear of the robotic device, laser 520 can be located at a front left corner of the robotic device, and laser 522 can be located at a front right corner of the robotic device. Lasers 510, 512, 520, 522, and/or laser scanner 524 can provide information to localize the robotic device within an environment. In some embodiments, lasers 510, 512, 520, 522, and/or laser scanner 524 can emit light that is reflected off of one or more reflectors—the reflected light can be detected by one or more laser sensors, and the robotic device can be localized within the environment based on a duration of time taken to detect the reflected light. In example embodiments, some or all of lasers 510, 512, 520, 522, and/or laser scanner 524 can include one or more laser sensors for detecting reflected laser light. Then, some or all of lasers 510, 512, 520, 522, and/or laser scanner 524 can generate data, including but not limited to, data related to a laser (e.g., maintenance data for the laser), data related to light emitted by the laser, and data related to one or more durations of time taken to detect reflected laser light by the laser sensor(s).

As illustrated in FIG. 5, some lasers, such as lasers 520, 522, and laser scanner 524 can be directly connected to network switch 330, while other lasers, such as lasers 510, 512, can be connected to network switch 330 via protocol converter 526. Protocol converter 526 can convert a communications protocol used by a laser, such as laser 510 and/or 512, to a communications protocol used by network switch 330; e.g., convert from a communications protocol based on RS-422 to a communications protocol based on Ethernet. Then, lasers 510, 512, 520, 522, and laser scanner 524 can send data to and receive commands from onboard system 320 via network switch 330 and perhaps protocol converter 526.

In some embodiments, robotic device(s) 120 can be subject to one or more failure conditions.

TABLE 1

| Name | Summary | Recovery Strategy |
|---|---|---|
| Stale Localization | Localization system is unable to determine robotic device pose and/or localization certainty estimate has exceeded bounds. | Robotic device will halt and notify human operator. The operator can intervene by manually driving robotic device to a location for re-localization and reengaging. |
| Trajectory Following | Trajectory following error exceeds threshold. | Robotic device will halt and attempt to restart trajectory following automatically. If system fails twice in a row then human operator will be notified. The operator can intervene by manually driving robotic device back onto roadmap. |
| No Safe Trajectory | Due to obstacle proximity, the trajectory planner cannot find a safe trajectory that would keep the robotic device a safe distance from known obstacles. | Robotic device will halt and notify human operator. The operator can intervene by manually driving robotic device around obstacle. |
| Hardware Fault | Steering/traction drive fault or other low-level hardware I/O fault condition | Robotic device will halt and notify human operator. The operator can power-cycle and manually drive robotic device back onto roadmap. |
| Pallet Detection Failure | Robotic device expected to discover a pallet at commanded location; no pallet was found | Robotic device will send message to a control service that includes sensor data relative to where the pallet was expected to be discovered. The control service will notify human operator and optionally may send pallet pose information manually. |
| Pallet Pose Estimation Failure | Robotic device could not determine pose of pallet relative to robotic device at high confidence. | Robotic device will send message to a control service that includes sensor data relative to where the pallet was expected. The control service will notify human operator and send pallet pose information manually. |

III. Example Computing Device Architecture

Figure 6A:
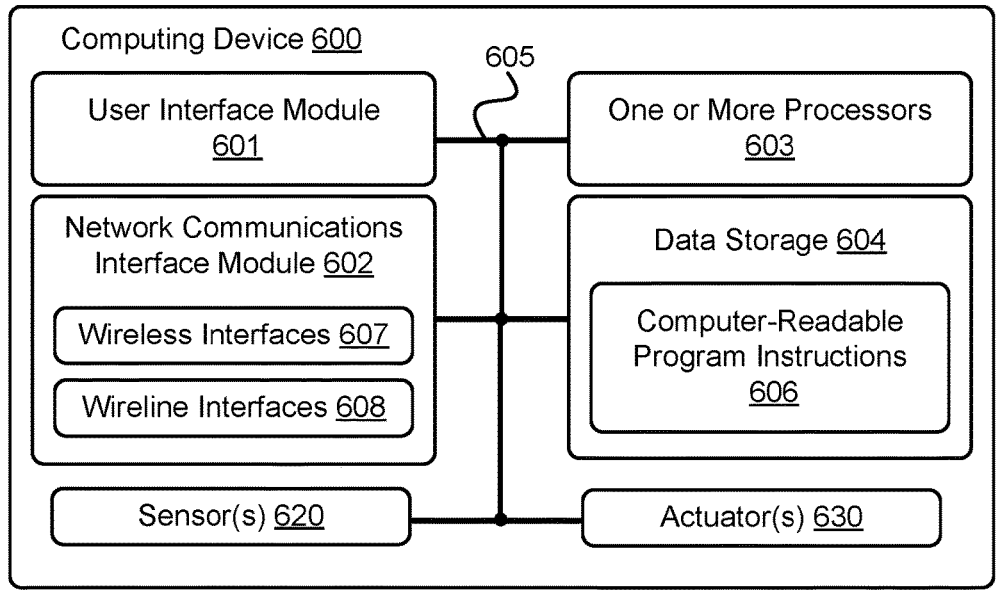
FIG. 6A is a functional block diagram of an example computing device, in accordance with an example embodiment.

FIG. 6A is a functional block diagram of computing device 600 (e.g., system, in accordance with an example embodiment. Computing device 600 shown in FIG. 6A can be configured to perform at least one function related to one or more of: planning system 110, offboard planner 112, roadmap planner 114, robotic device 120, onboard software 130, hardware 150, system 200, warehouse management system 210, executor 220, logistics interface 310, network 318, onboard system 320, onboard sensors 322, planning/execution processors 324, network switch 330, central vehicle controller 332, programmable logic controller 334, vehicle master 336, device sensors 338, drives 340, robotic device architecture 400, laser scanner architecture 500, and method 1000. Computing device 600 may include a user interface module 601, a network-communication interface module 602, one or more processors 603, data storage 604, one or more sensors 620, and one or more actuators 630, all of which may be linked together via a system bus, network, or other connection mechanism 605. In some embodiments, computing device 600 can be configured to act as part or all of a warehouse control system.

User interface module 601 can be operable to send data to and/or receive data from external user input/output devices. For example, user interface module 601 can be configured to send and/or receive data to and/or from user input devices such as a keyboard, a keypad, a touch screen, a computer mouse, a trackball, a joystick, a camera, a voice recognition module, and/or other similar devices. User interface module 601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 601 can also be configured to generate audible output(s), such as a speaker, speaker jack, audio output port, audio output device, earphones, and/or other similar devices.

Network-communications interface module 602 can include one or more wireless interfaces 607 and/or one or more wireline interfaces 608 that are configurable to communicate via a network. Wireless interfaces 607 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interfaces 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 602 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Processors 603 can include one or more general purpose processors, and/or one or more special purpose processors (e.g., digital signal processors, graphics processing units, application specific integrated circuits, etc.). Processors 603 can be configured to execute computer-readable program instructions 606 that are contained in the data storage 604 and/or other instructions as described herein.

Data storage 604 can include one or more computer-readable storage media that can be read and/or accessed by at least one of processors 603. The one or more computer-readable storage media can include volatile and/or non-volatile storage components, such as optical, magnetic, organic or other memory or disc storage, which can be integrated in whole or in part with at least one of processors 603. In some embodiments, data storage 604 can be implemented using a single physical device (e.g., one optical, magnetic, organic or other memory or disc storage unit), while in other embodiments, data storage 604 can be implemented using two or more physical devices.

Data storage 604 can include computer-readable program instructions 606 and perhaps additional data. In some embodiments, data storage 604 can additionally include storage required to perform at least part of the herein-described methods and techniques and/or at least part of the functionality of the devices and networks.

In some embodiments, computing device 600 can include one or more sensors 620. Sensor(s) 620 can be configured to measure conditions in an environment for computing device 600 and provide data about that environment; e.g., environment 100. For example, sensor(s) 620 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 600, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 600, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about the computing device 600, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 620 are possible as well.

Computing device 600 can include one or more actuators 630 that enable computing device 600 to initiate movement. For example, actuator(s) 630 can include or be incorporated with robotic joints connecting robotic limbs to a robotic body. For example, actuator(s) 630 can include respective robotic hip and robotic shoulder joints connecting respective robotic legs and arms to the robotic body. Further, the actuator(s) 630 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 630 can include respective robotic ankle joints connecting the robotic legs to robotic feet and respective robotic wrist joints connecting the robotic arms to robotic hands. In addition, actuator(s) 630 can include motors for moving the robotic limbs. As such, the actuator(s) 630 can enable mobility of computing device 600. Many other examples of actuator(s) 630 are possible as well.

Figure 6B:
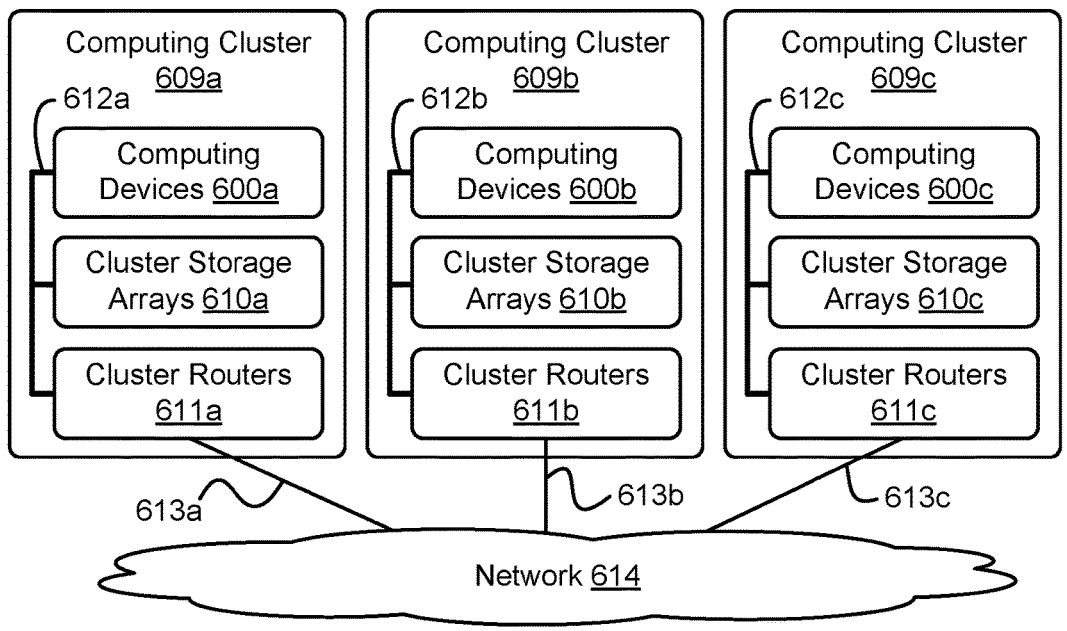
FIG. 6B depicts a network of computing clusters arranged as a cloud-based server system, in accordance with an example embodiment.

FIG. 6B depicts a network 614 of computing clusters 609a, 609b, 609c arranged as a cloud-based server system in accordance with an example embodiment. Computing clusters 609*a*, 609*b*, 609*c* can be cloud-based devices that store program logic and/or data of cloud-based applications and/or services; e.g., perform at least one function related to one or more of: planning system 110, offboard planner 112, roadmap planner 114, robotic device 120, onboard software 130, hardware 150, system 200, warehouse management system 210, executor 220, logistics interface 310, network 36, onboard system 320, onboard sensors 322, planning/execution processors 324, network switch 330, central vehicle controller 332, programmable logic controller 334, vehicle master 336, device sensors 338, drives 340, robotic device architecture 400, laser scanner architecture 500, and method 1000.

In some embodiments, computing clusters 609*a*, 609*b*, 609*c* can be a single computing device residing in a single computing center. In other embodiments, computing clusters 609*a*, 609*b*, 609*c* can include multiple computing devices in a single computing center, or even multiple computing devices located in multiple computing centers located in diverse geographic locations. For example, FIG. 6B depicts each of computing clusters 609*a*, 609*b*, 609*c* residing in different physical locations.

In some embodiments, data and services at computing clusters 609*a*, 609*b*, 609*c* can be encoded as computer readable information stored in non-transitory, tangible computer readable media (or computer readable storage media) and accessible by other computing devices. In some embodiments, computing clusters 609*a*, 609*b*, 609*c* can be stored on a single disk drive or other tangible storage media, or can be implemented on multiple disk drives or other tangible storage media located at one or more diverse geographic locations.

FIG. 6B depicts a cloud-based server system in accordance with an example embodiment. In FIG. 6B, functionality of a planning system can be distributed among three computing clusters 609*a*, 609*b*, and 609*c*. Computing cluster 609*a* can include one or more computing devices 600*a*, cluster storage arrays 610*a*, and cluster routers 611*a* connected by a local cluster network 612*a*. Similarly, computing cluster 609*b* can include one or more computing devices 600*b*, cluster storage arrays 610*b*, and cluster routers 611*b* connected by a local cluster network 612*b*. Likewise, computing cluster 609*c* can include one or more computing devices 600*c*, cluster storage arrays 610*c*, and cluster routers 611*c* connected by a local cluster network 612*c*.

In some embodiments, each of the computing clusters 609*a*, 609*b*, and 609*c* can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 609*a*, for example, computing devices 600*a* can be configured to perform various computing tasks of a planning system, a robotic device, and/or a computing device. In one embodiment, the various functionalities of a planning system, a robotic device, and/or a computing device can be distributed among one or more computing devices 600*a*, 600*b*, and 600*c*. Computing devices 600*b* and 600*c* in respective computing clusters 609*b* and 609*c* can be configured similarly to computing devices 600*a* in computing cluster 609*a*. On the other hand, in some embodiments, computing devices 600*a*, 600*b*, and 600*c* can be configured to perform different functions.

In some embodiments, computing tasks and stored data associated with a planning system, a robotic device, and/or a computing device can be distributed across computing devices 600*a*, 600*b*, and 600*c* based at least in part on the processing requirements of a roadmap editor, single agent planning software, multiple agent planning software, a routing computing device, and/or a computing device, the processing capabilities of computing devices 600*a*, 600*b*, and 600*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 610*a*, 610*b*, and 610*c* of the computing clusters 609*a*, 609*b*, and 609*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a planning system, a robotic device, and/or a computing device can be distributed across computing devices 600*a*, 600*b*, and 600*c* of computing clusters 609*a*, 609*b*, and 609*c*, various active portions and/or backup portions of these components can be distributed across cluster storage arrays 610*a*, 610*b*, and 610*c*. For example, some cluster storage arrays can be configured to store one portion of the data of a planning system, a robotic device, and/or a computing device can, while other cluster storage arrays can store other portion(s) of data of a planning system, a robotic device, and/or a computing device. Additionally, some cluster storage arrays can be configured to store backup versions of data stored in other cluster storage arrays.

The cluster routers 611*a*, 611*b*, and 611*c* in computing clusters 609*a*, 609*b*, and 609*c* can include networking equipment configured to provide internal and external communications for the computing clusters. For example, the cluster routers 611*a* in computing cluster 609*a* can include one or more internet switching and routing devices configured to provide (i) local area network communications between the computing devices 600*a* and the cluster storage arrays 610*a* via the local cluster network 612*a*, and (ii) wide area network communications between the computing cluster 609*a* and the computing clusters 609*b* and 609*c* via the wide area network connection 613*a* to network 614. Cluster routers 611*b* and 611*c* can include network equipment similar to the cluster routers 611*a*, and cluster routers 611*b* and 611*c* can perform similar networking functions for computing clusters 609*b* and 609*b* that cluster routers 611*a* perform for computing cluster 609*a*.

In some embodiments, the configuration of the cluster routers 611*a*, 611*b*, and 611*c* can be based at least in part on the data communication requirements of the computing devices and cluster storage arrays, the data communications capabilities of the network equipment in the cluster routers 611*a*, 611*b*, and 611*c*, the latency and throughput of local networks 612*a*, 612*b*, 612*c*, the latency, throughput, and cost of wide area network links 613*a*, 613*b*, and 613*c*, and/or other factors that can contribute to the cost, speed, fault-tolerance, resiliency, efficiency and/or other design criteria of the moderation system architecture.

IV. Example Embodiments

As noted above, the present disclosure includes implementations that relate to a layered multi agent planning framework for centralized coordination of agents moving within an environment.

Figure 7:
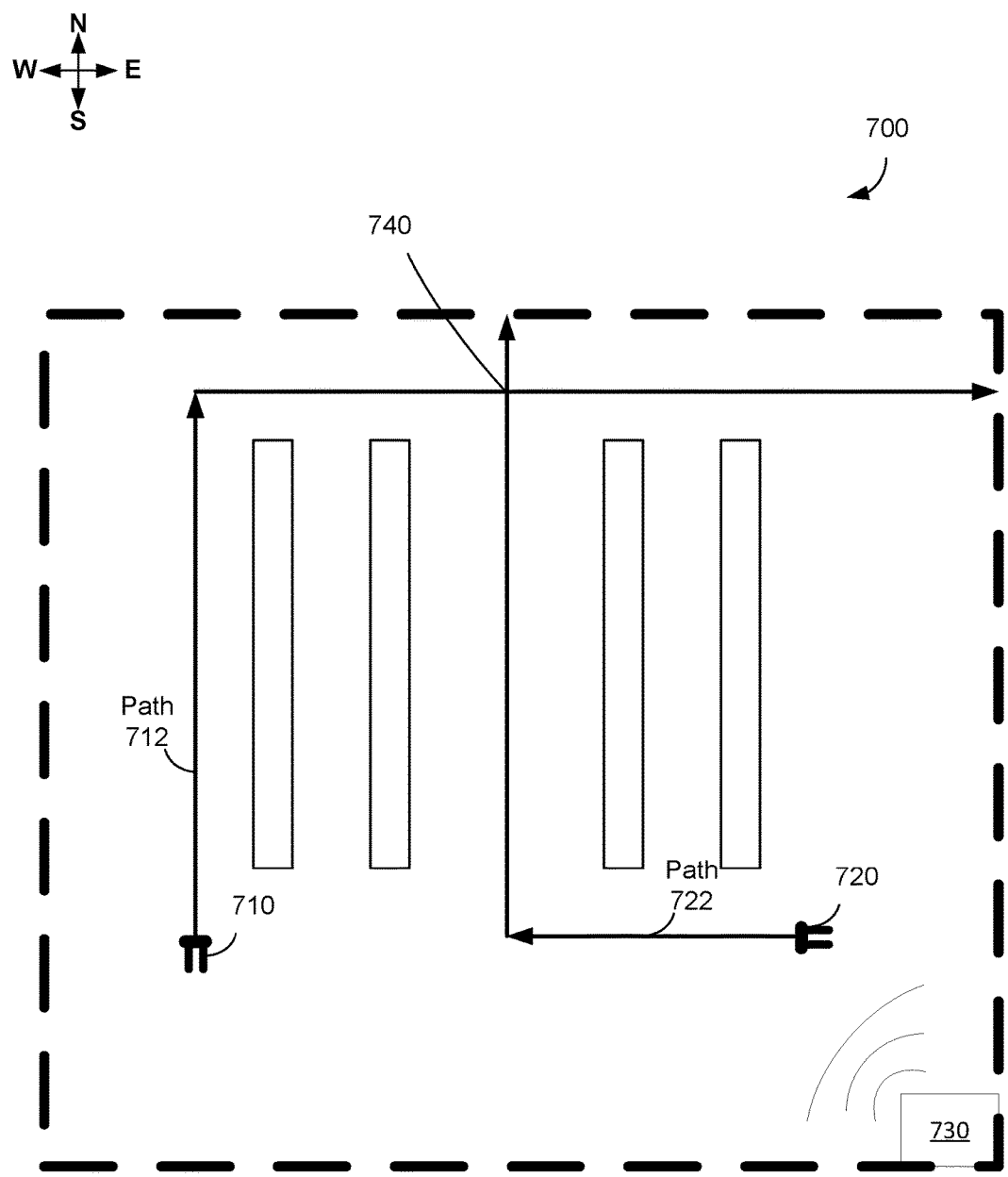
FIG. 7 shows an example system, in accordance with an example embodiment.

FIG. 7 shows an example system 700 according to an example embodiment. System 700 may include a first robotic device 710 and a second robotic device 720. Robotic devices 710 and 720 may be similar or identical to robotic device 120 described above. System 700 may also include a computing device 730, which may be similar or identical to warehouse management system 210 and/or planning system 110 described above.

Computing device 730 may be configured for receiving first and second coordinated paths for the respective first and second robotic devices. Each coordinated path may be selected, generated, created, or otherwise designed such that it does not conflict with other coordinated paths, and a robotic device following a coordinated path can simultaneously operate in the same environment as a plurality of other robotic devices without conflict. FIG. 7 illustrates first robotic device 710 with a first coordinated path 712, and second robotic device 720 with a second coordinated path 722.

Each robotic device may be given a task, and a coordinated path may be generated, selected, or otherwise planned to allow the robotic device to accomplish that task. For instance, first robotic device 710 and second robotic device 720 in FIG. 7 have been tasked with traveling to different parts of the environment. First coordinated path 712 has first robotic device 710 scheduled to travel north and then east. Second coordinated path 722 has second robotic device 720 travel west and then north. The coordinated paths may intersect at one or more locations, such as intersection point 740.

In some examples, a coordinated path may include one or more positions and corresponding times. For instance, a coordinated path may indicate that a robotic device should be in position $p_0$ at time $t_0$, position $p_1$ at time $t_1$, position $p_2$ at time $t_2$ and so on. The coordinated path may be a schedule or timeline of movements, velocities, positions, orientations, or other characteristics of a given robotic device.

In some examples, a coordinated path may include one or more dependency edges. Dependency edges may be determined at the same time as the generation, selection, or design of a coordinated path. And further, dependency edges may be predetermined by a path planning system prior to a robotic device receiving a coordinated path. A dependency edge may indicate two positions, a first position on the coordinated path itself and a second position on a second coordinated path. The first position may be a position at which a robotic device executing the coordinated path is scheduled to stop and wait. The second position maybe a position at which a second robotic device must be located before the first robotic device can proceed moving along its coordinated path. For example, in FIG. 7 a dependency edge may have the first position and second position at or near intersection point 740. The execution of coordinated paths 712 and 722 by robotic devices 710 and 720 may require that robotic device 710 wait at a position near intersection point 740 for robotic device 720 to pass by.

Figure 8:
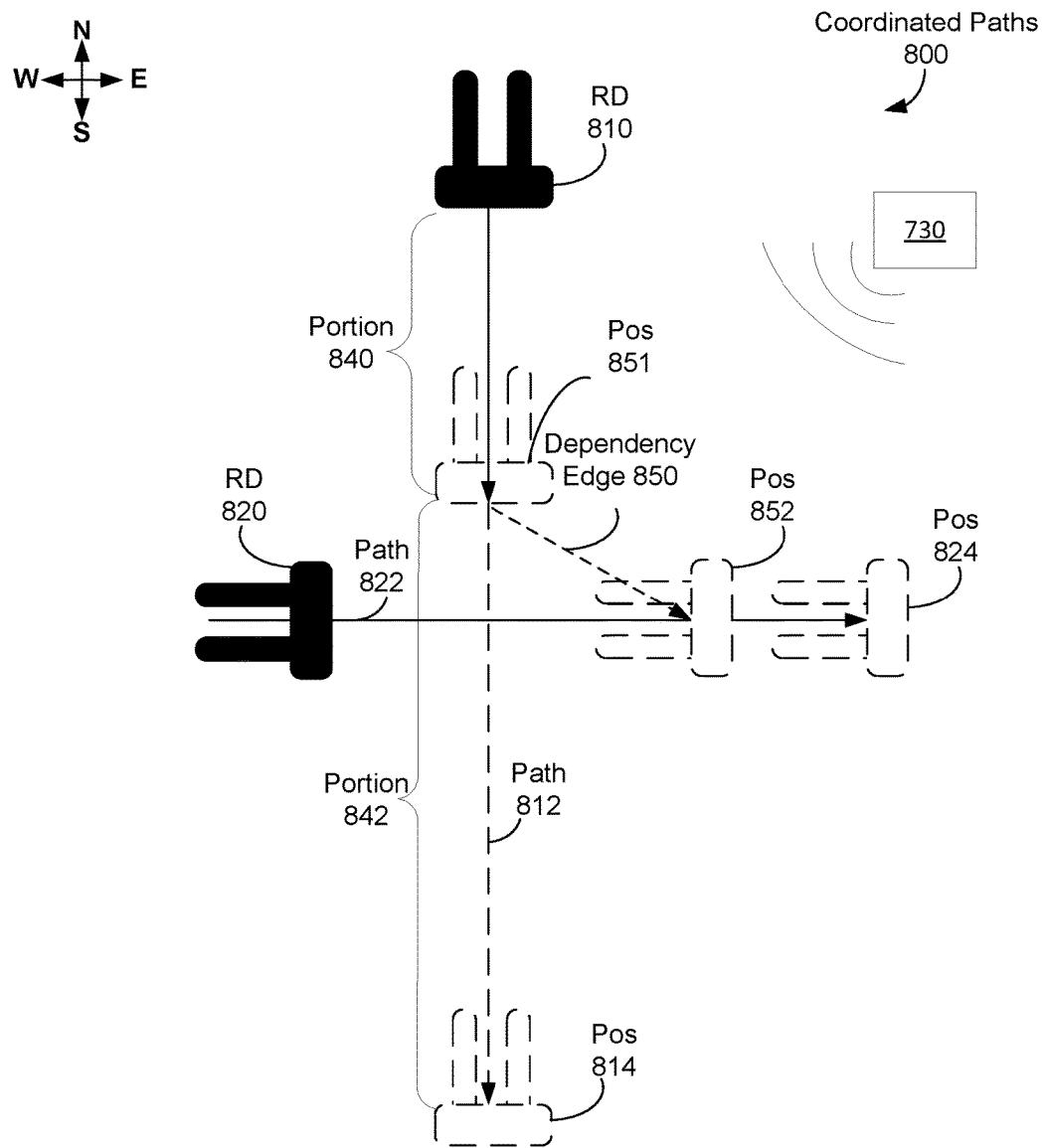
FIG. 8 illustrates example coordinated paths for two robotic devices, in accordance with an example embodiment.

FIG. 8 shows coordinated paths 800 for two robotic devices 810 and 820, in accordance with an example embodiment. As shown in FIG. 8, coordinated paths 800 include first coordinated path 812 for first robotic device 810 to reach position 814, second coordinated path 822 for second robotic device 820 to reach position 824, and dependency edge 850. Dependency edge 850 indicates that first robotic device 810 has to wait at position 851 until second robotic device 820 reaches position 851 to avoid collisions between robotic devices 810 and 820.

In this example, second robotic device 820 may be a blocking device for first robotic device 810, as second robotic device 820 impedes, or blocks, first robotic device 810 from proceeding until blocking second robotic device 820 reaches position 851. Once second robotic device 820 has reached and/or passed position 851 on its way along second coordinated path 822 to position 824, first robotic device 810 can then proceed from position 851 on its way along first coordinated path 812 to position 814.

In some embodiments, a multi-agent planning approach can include an implementation of Windowed Hierarchical Cooperative A* (WHCA*), various A* variants, and/or other Multi-Agent Path Finding Algorithms. WHCA*, for example, can work over multiple levels of abstraction, on both physically realistic and extremely abstract versions of a planning problem, based on its use of "windowed" or fixed-depth searches of a planning solution space. Windowed SAT applies the concept of a windowed search to generation and subsequent solution of Boolean equations; that is, a Boolean equation can be generated based on a windowed search of the planning solution space and the resulting windowed Boolean equation can be solved using a SAT solver.

Coordinated paths with dependency edges that are output based on the Boolean equation solved by a SAT planner can be provided as inputs to an executor. The executor can convert the coordinated paths with dependencies into a set of executable paths that are sent as path commands to each agent. At each of one or more time steps or periods, the executor can monitor progress of each agent along its path and send path commands up to the next unsatisfied dependency. If an agent reaches the end of its path before a blocking agent completes their actions, the agent can stop and wait for a new path.

In some examples, a dependency edge may indicate a first position where a robotic device must stop and wait for a condition to be satisfied. In some examples, the condition may be satisfied by a second robotic device reaching a second position on a second coordinated path. In other examples, the condition may be satisfied in other ways such as by an amount of time elapsing. Further, the first and second positions may also include a buffer. For instance, the first and/or second position of the dependency edge may include a buffer, such that the dependency edge is satisfied with the second robotic device reaches the second position plus some buffer amount of time or distance. This buffer may provide an additional level of safety to prevent a collision.

In some examples, a coordinated path may include a plurality of dependency edges. Each of the plurality of dependency edges may indicate a separate position on the coordinated path where a robotic device must wait for a condition to be satisfied (such as a second robotic device reaching a second position) before the robotic device may proceed. One or more dependency edges may be in the same physical location, but at different time, such as where a coordinated path takes a robotic device in a loop across the same position in the environment at different times.

Referring back to system 700 of FIG. 7, computing device 730 may be configured for identifying the first dependency edge of the first coordinated path from a plurality of dependency edges. The first dependency edge may be a next unsatisfied dependency edge. The next unsatisfied dependency edge may be determined based on a current position of the first robotic device, and projecting forward to determine the next dependency edge that the first robotic device will come across during execution of the first coordinated path.

Computing device 730 may also be configured for determining a first traversable portion of the first coordinated path, wherein the first traversable portion extends to a first stopping position that is before or at the first position on the first coordinated path. The first position may be a next unsatisfied dependency edge along the first coordinated path. The first traversable portion may be a next segment, chunk, or other subsection of the coordinated path. In some examples, the first traversable portion may be a distance along the first coordinated path that the first robotic device can traverse in an amount of time. For instance, a time of five seconds may be used, and the first traversable portion may be determined based on a distance along the first coordinated path that the first robotic device can travel in five seconds. The actual distance may depend on many factors, such as the grade of the environment, one or more safety or performance factors, or speed, orientation, load, or other characteristic of the robotic device, for example.

In some examples, the first traversable portion of the first coordinated path may be determined such that the first traversable portion begins at a current position of the first robotic device. Alternatively, the first traversable portion may be determined such that the starting position is a scheduled position of the first robotic device, such as a position designated by the first coordinated path. The scheduled position may be different from the current or actual position.

The first traversable portion may be determined such that it has a stopping or ending position that is before or at a dependency edge of the first coordinated path. To explain, consider two different but similar scenarios. Suppose a robotic device has a straight coordinated path that extends from a current position 25 meters directly north with a dependency edge at a position 10 meters from the current position. The first traversable portion may be determined based on a five second interval, and if the robotic device travels at one meter per second along this path the first traversable portion will be a five meter segment of the coordinated path, ending at a position 5 meters from the current position. The stopping position is thus well before the dependency edge.

Alternatively, suppose a second robotic device has a straight coordinated path that extends from a current position twenty-five meters directly north with a dependency edge at a position three meters from the current position. The first traversable portion may be determined based on a five second interval, and if the robotic device travels at one meter per second along this path the first traversable portion will be a three meter segment of the coordinated path, ending at the dependency edge three meters from the current position. As such, the first traversable portion may be determined to extend to a first stopping position that is before or at the dependency edge of the first coordinated path.

In some examples, the first traversable portion may extend to a stopping position that is limited by a maximum length limit. For instance, as described above, the first traversable portion may be determined based on a distance that may be traveled in a given amount of time (e.g., five seconds). Similarly, the first traversable portion may be limited by a maximum distance (e.g., five meters). Other distances, times, or maximum limits may be used as well.

Computing device 730 of FIG. 7 may be configured for providing a first instruction to the first robotic device to traverse the first traversable portion of the first coordinated path. Once a first traversable portion has been determined, an instruction may be sent to the first robotic device to execute, carry out, or otherwise traverse the first traversable portion. In some examples, the first traversable portion may include movement from a current position of the first robotic device to a second position.

FIG. 8 illustrates a first traversable portion 840 of the first coordinated path 812. First traversable portion 840 extends from the current position of first robotic device 810 to the first position 851 of dependency edge 850. The first instruction may cause first robotic device 810 to move from its current position to position 851, at which point first robotic device 810 may wait for the dependency to be satisfied, or for further instructions.

Computing device 730 may also be configured to determine that the second robotic device has passed the second position on the second coordinated path. Computing device 730 may request and/or receive data from one or more sensors, robotic devices, or other devices operating in the environment that may indicate the location of second robotic device 820. FIG. 8 shows the second position as position 852.

Computing device 730 may be configured for determining a second traversable portion 842 of first coordinated path 812, wherein second traversable portion 842 extends to a second stopping position that is beyond the first position on the first coordinated path. In FIG. 8, second traversable portion 842 extends from position 851 to position 814 along first coordinated path 812. However, in some examples second traversable portion 842 may extend from a current position of first robotic device 810 (which may be different before position 852) to a position later along the first coordinated path. Second traversable portion 842 may be determined in a manner that is similar or identical to the first traversable portion. But the second traversable portion may extend to a second stopping position along the first coordinated path that is beyond the first stopping position (i.e., beyond the dependency).

Then, after the first robotic device determines that the second robotic device 820 has passed position 852, computing device 730 may be configured for providing a second instruction to the first robotic device to traverse the second traversable portion of the first coordinated path. This instruction may be sent at any time before or after it is determined that second robotic device 820 has crossed position 852. However, the first robotic device may be instructed to wait until after second robotic device 820 has reached or crossed position 852 to traverse the second traversable portion.

In some examples, first robotic device 730 may be configured for determining that a position of a first robotic device has changed by more than a threshold amount. For example, the threshold amount may be one meter, five meters, or some other distance. Further, computing device 730 may be configured for determining that a predetermined fixed amount of time has elapsed, such as 5 seconds, from the last time an instruction was sent to a robotic device.

Responsive to determining that the position of the robotic device has changed by more than the threshold amount, or that a predetermined fixed amount of time has passed or elapsed, computing device 730 may determine an updated first traversable portion of the first coordinated path. The updated first traversable portion may be a portion of the first coordinated path extending form a current or scheduled position of the first robotic device to a future stopping position. Computing device 730 may then provide an updated instruction to the first robotic device to traverse the updated first traversable portion of the first coordinated path. Thus, the computing device may provide one or more instructions and one or more traversable portions to a robotic device based on a change in position of the robotic device, in addition to a second robotic device reaching or crossing a position of a second coordinated path.

In some examples, system 700 may also include a path planning system (not shown). The path planning system may be a computing device or system configured for designing, generating, selecting, or otherwise providing one or more coordinated paths to one or more computing devices or systems. In some cases, the path planning system may generate one or more coordinated paths in response to a request from computing device 730. For instance, computing device 730 may determine that one or more errors, deviations, or problems have occurred in the execution of one or more coordinated paths by one or more robotic devices. Computing device 730 may then determine that new coordinated paths are needed, and send a request to the path planning system.

In one example, computing system 730 may receive a first coordinated path for a first robotic device and a second coordinated path for a second robotic device. Computing device 730 may receive information regarding the position, orientation, progress along the coordinated path, or timing information corresponding to one or more robotic devices. Computing device 730 may determine that the first robotic device is behind schedule by more than a threshold amount, and then send a request to the path planning system for updated coordinated paths for either or both of the first and second robotic devices.

Still further, computing device 730 may receive the first and second coordinated paths, and provide a plurality of instructions to the first robotic device to traverse a plurality of traversable portions of the first coordinated path during a time between the computing device requesting and receiving updated first and second coordinated paths from the path planning system. For example, computing device 730 may provide instructions to first a first robotic device to traverse a first traversable portion of the first coordinated path, and then determine that an updated coordinated path is needed. The updated or new coordinated path may be different from the first coordinated path in at least one respect. Computing device 730 may then request a new or updated first coordinated path. But before a new or updated first coordinated path is received, computing device 730 may transmit further instructions to the first robotic device to traverse a second traversable portion of the first coordinated path. As such, the first robotic device may continue to execute portions of the first coordinated path even while a new or updated coordinated path is being generated. This may allow the first robotic device to continue moving forward, even though a new path is being generated that may change a portion of the coordinated path.

Figure 9A:
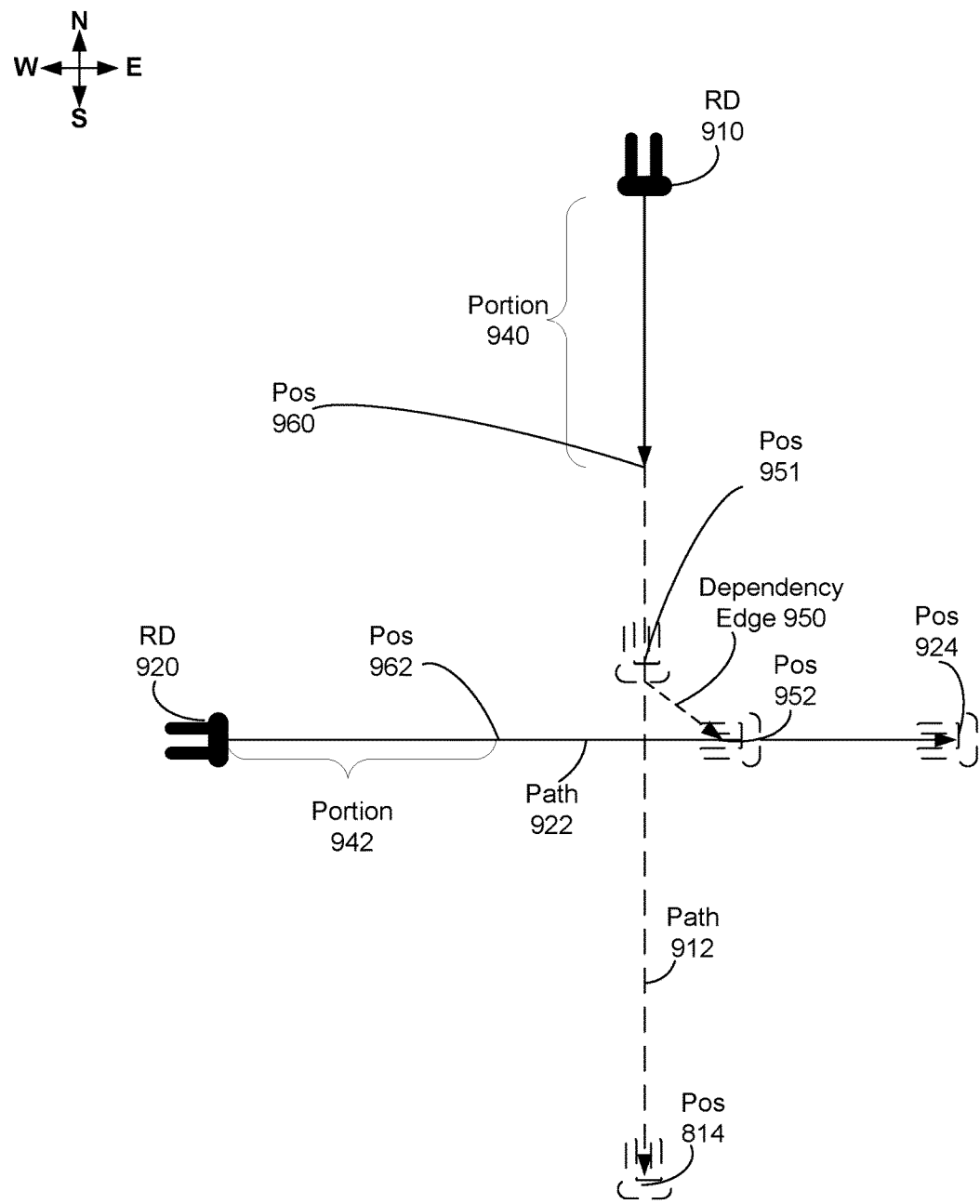
FIG. 9A-C illustrate three scenarios, in accordance with example embodiments.
Figure 9B:
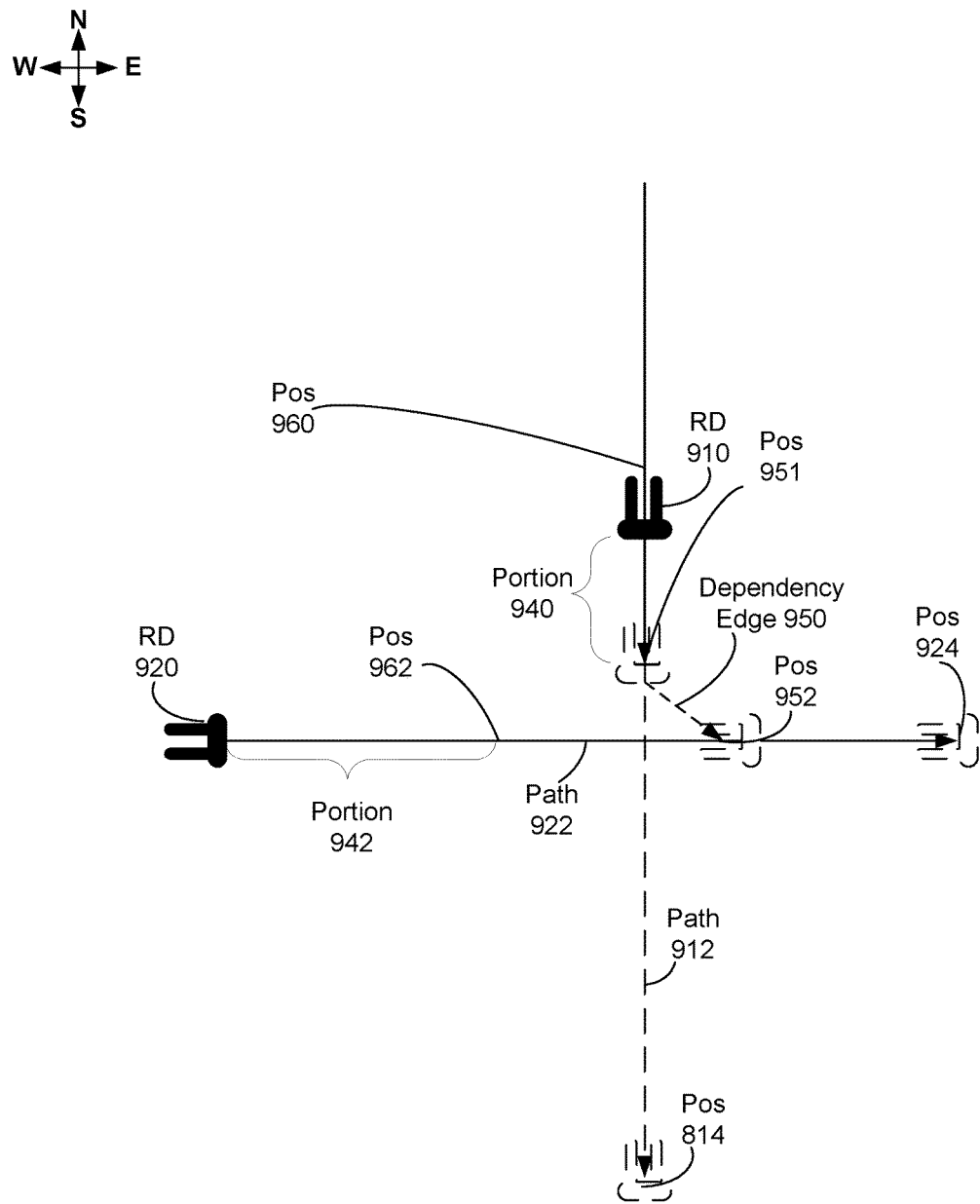
Figure 9C:
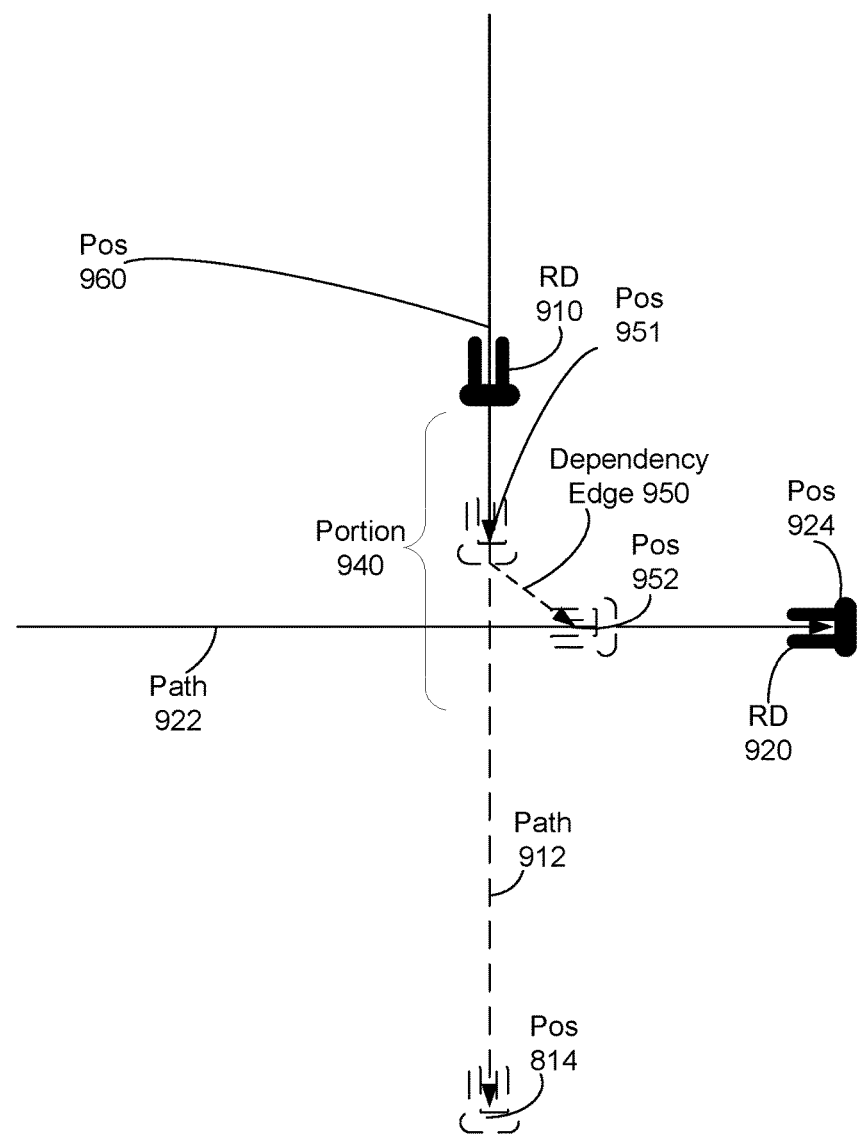

FIGS. 9A-C illustrate three different scenarios, in accordance with embodiments of the present disclosure. FIGS. 9A-C show three scenarios having different first traversable portions, determined based on the circumstances of each scenario. For simplicity and the sake of explanation, FIGS. 9A-C will be described via a five-second time interval for determining a traversable portion. As such, a traversable portion may be determined to be a distance along a coordinated path that a given robotic device can travel in five seconds.

In FIG. 9A, first robotic device 910 has first coordinated path 912 that ends at position 914. Second robotic device 920 has second coordinated path 922 that ends at position 924. Further, first coordinated path 912 has a dependency edge 950 with a first position 951 and a second position 952.

In this example, the computing device may determine that first robotic device 910 can travel to position 960 in five seconds, and thus the first traversable portion 940 extends from the current position of first robotic device 910 to first stopping position 960. And because this stopping position is before first position 951 of dependency edge 950, the computing device may provide an instruction to first robotic device 910 to execute the full five second segment and travel to position 960. Similarly, the computing device may determine that second robotic device can travel to position 962 in five seconds, and may determine that portion 942 is a first traversable portion corresponding to second robotic device 920. As such, the computing device may provide instructions to both robotic device to traverse the full distance possible in the five second segment.

FIG. 9B shows a second scenario, which may be similar to the scenario shown in FIG. 9A in some respects. However in FIG. 9B, first robotic device 910 is at a position much closer to first position 951 of dependency edge 950. When first robotic device 910 is located at this position, the computing device may determine that the distance first robotic device 910 can travel in five second would go beyond first position 951 of dependency edge 950. The computing device may then determine that the first traversable portion 940 should instead be capped or cut short. As a result, in FIG. 9B the first traversable portion may be only two seconds of movement (or a corresponding distance), such that first robotic device stops at or near position 951. At the same time, however, the computing device may determine that second robotic device 920 should receive instructions to traverse a full five second segment (i.e., traversable portion 942).

FIG. 9C illustrates a third scenario, in which the second robotic device has passed position 952 well before first robotic device 910 reaches first position 951 of dependency edge 950. In this scenario, the computing device may determine that the distance first robotic device 910 can travel in five second would go beyond first position 951 of dependency edge 950. Ordinarily, the computing device may then determine that the first traversable portion 940 should instead be capped or cut short. However, as soon as second robotic device 920 reached position 952 and the dependency edge was satisfied, the first computing device may then determine the first traversable portion to again be a full five second segment (or a corresponding distance). Thus, as soon as a next dependency edge of first coordinated path 912 is satisfied, the dependency edge no longer acts to cap or cut short a traversable portion. The computing device may immediately instruct first robotic device 910 to travel a full five second segment.

As a result, the computing device maximizes the ability of the robotic devices to continue operation even where there are dependencies, where a slower path planning system may require the robotic devices to stop in order to receive updated coordinated paths.

V. Example Operations

Figure 10:
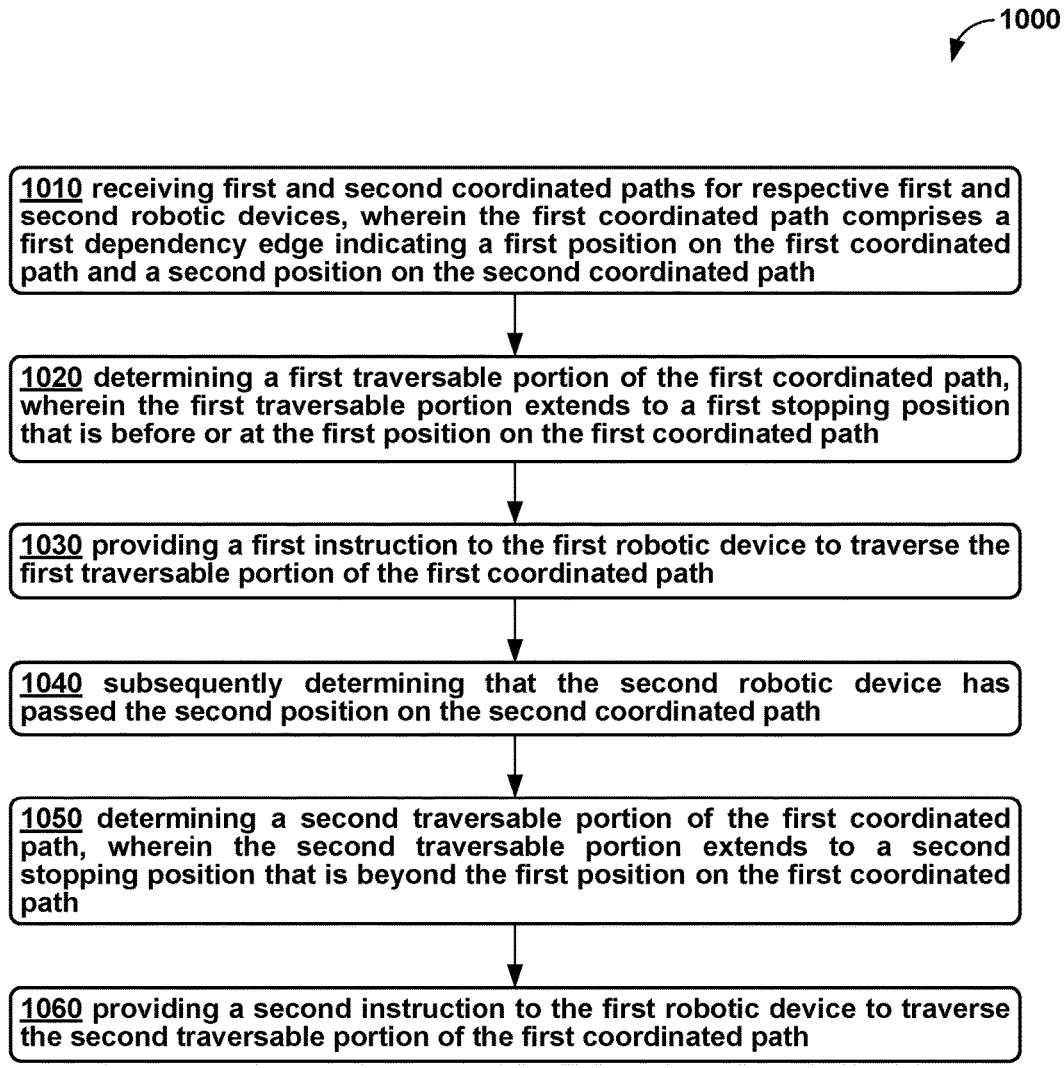
FIG. 10 is a flowchart of a method, in accordance with an example embodiment.

FIG. 10 illustrates a flowchart of an example method 1000. This example method may be executed by computing device 730, planning system 110, robotic devices 120, 710, 720, 810, 820, 910, or 920, warehouse management system 210, computing device 600, computing clusters 609a-c, or one or more other computing devices or systems.

At block 1010, method 1000 may include receiving first and second coordinated paths for respective first and second robotic devices, wherein the first coordinated path comprises a first dependency edge indicating a first position on the first coordinated path and a second position on the second coordinated path.

At block 1020, method 1000 may include determining a first traversable portion of the first coordinated path, wherein the first traversable portion extends to a first stopping position that is before or at the first position on the first coordinated path. The first traversable portion may thus be a portion of the first coordinated path beginning with a position of the first robotic device and extending along the first coordinated path up to a maximum limit, or to the first position of the dependency edge, whichever comes first.

At block 1030, method 1000 may include providing a first instruction to the first robotic device to traverse the first traversable portion of the first coordinated path.

At block 1040, method 1000 may include subsequently determining that the second robotic device has passed the second position on the second coordinated path. This may be determined by one or more sensors connected to the first and/or second robotic devices, or placed within the environment, for example.

At block 1050, method 1000 may include determining a second traversable portion of the first coordinated path, wherein the second traversable portion extends to a second stopping position that is beyond the first position on the first coordinated path.

And at block 1060, method 1000 may include providing a second instruction to the first robotic device to traverse the second traversable portion of the first coordinated path.

In some embodiments, method 1000 may further include receiving, from a path planning system, the first and second coordinated paths, determining that the first and/or second robotic device is behind schedule, and responsively requesting an updated first and/or second coordinated path from the path planning system.

Still further, method 1000 may include receiving the first and second coordinated paths, and providing a plurality of instructions to the first robotic device to traverse a plurality of traversable portions, all during the time between a request for an updated coordinated path and the receipt of the updated coordinated path.

VI. Example Variations

The examples and embodiments in this disclosure have been described with reference to a dependency edge in the form of an intersection, where one robotic device waits for a second robotic device to cross along a perpendicular path. Alternatively, non-perpendicular intersections may exist as well.

In one example, a first robotic device may have a first coordinated path, and a second robotic device may have a second coordinated path that follows the first coordinated path for a portion. The timing of execution may be such that the second robotic device "leads" the first robotic device, for example like a convoy of vehicles travelling in the same direction with the second robotic device in front of the first robotic device. In this example, the first coordinated path may include a plurality of dependency edges along the coordinated path, because the first robotic device may have to wait for the second robotic device to move before the first robotic device can follow. In some cases the first coordinated path may include a large number of consecutive dependency edges, and as the second robotic device moves along the path, the plurality of consecutive dependency edges may be satisfied one at a time. A first traversable portion of the first coordinated path may be determined such that it extends from a current or scheduled position of the first robotic device up to the most recently satisfied dependency edge, allowing the first robotic device to move forward in small increments based on how close together the dependency edges are along the path.

VII. Conclusion

Some examples disclosed herein have been described with reference to an example orientation or layout of robotic devices and coordinated paths. It should be appreciated that alternative orientations and layouts are possible and contemplated herein.

It should be understood that arrangements described herein are for purposes of example only. As such, those skilled in the art will appreciate that other arrangements and other elements (e.g. devices, systems, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing example implementations only, and is not intended to be limiting.

The invention claimed is:

1. A method comprising:
   receiving, by a computing device, first and second coordinated paths for respective first and second robotic devices, wherein the first coordinated path comprises a first dependency edge indicating a first position on the first coordinated path and a second position on the second coordinated path, wherein the second position on the second coordinated path is to be reached by the second robotic device before the first robotic device proceeds past the first position on the first coordinated path;
   before the second robotic device has reached the second position on the second coordinated path, determining, by the computing device, a first traversable portion of the first coordinated path, wherein the first traversable portion extends to the first position on the first coordinated path when a distance between the first robotic device and the first position is less than a maximum length limit;
   providing, by the computing device, a first instruction to the first robotic device to traverse the first traversable portion of the first coordinated path;
   subsequently determining, by the computing device, that the second robotic device has passed the second position on the second coordinated path;
   after the second robotic device has passed the second position on the second coordinated path, determining, by the computing device, a second traversable portion of the first coordinated path, wherein the second traversable portion has a length equal to the maximum length limit; and
   providing, by the computing device, a second instruction to the first robotic device to traverse the second traversable portion of the first coordinated path.

2. The method of claim 1, wherein the maximum length limit is based on a length of the first coordinated path that is traversable in a predetermined time unit.

3. The method of claim 1, wherein the first and second coordinated paths are received from a path planning system, the method further comprising:
 determining that the first robotic device is behind schedule by more than a threshold amount; and
 responsive to determining that the first robotic device is behind schedule by more than the threshold amount, the computing device requesting updated first and second coordinated paths from the path planning system.

4. The method of claim 3, further comprising:
 receiving, by the computing device, updated first and second coordinated paths from the path planning system; and
 providing, by the computing device, a plurality of instructions to the first robotic device to traverse a plurality of traversable portions of the first coordinated path during a time between the computing device requesting and receiving updated first and second coordinated paths from the path planning system.

5. The method of claim 1, wherein the first traversable portion of the first coordinated path comprises a starting position, and wherein the starting position is a current position of the first robotic device at a time when the first traversable portion is determined.

6. The method of claim 1, wherein the first traversable portion of the first coordinated path comprises a starting position, and wherein the starting position is a scheduled position of the first robotic device at a time when the first traversable portion is determined.

7. The method of claim 1, wherein the first coordinated path further comprises a plurality of dependency edges indicating respective first positions on the first coordinated path, and the method further comprises:
 identifying the first dependency edge to be a next unsatisfied dependency edge of the plurality of dependence edges before determining the first traversable portion of the first coordinated path.

8. The method of claim 1, further comprising:
 determining that a position of the first robotic device has changed by more than a threshold amount; and
 responsive to determining that the position of the first robotic device has changed by more than the threshold amount, determining an updated first traversable portion of the first coordinated path, and providing an updated instruction to the first robotic device to traverse the updated first traversable portion of the first coordinated path.

9. The method of claim 1, further comprising:
 determining that a predetermined fixed amount of time has passed; and
 responsive to determining that the predetermined fixed amount of time has passed, determining an updated first traversable portion of the first coordinated path, and providing an updated instruction to the first robotic device to traverse the updated first traversable portion of the first coordinated path.

10. A system comprising:
 a first robotic device;
 a second robotic device; and
 a computing device, wherein the computing device is configured to:
 receive first and second coordinated paths for the respective first and second robotic devices, wherein the first coordinated path comprises a first dependency edge indicating a first position on the first coordinated path and a second position on the second coordinated path, wherein the second position on the second coordinated path is to be reached by the second robotic device before the first robotic device proceeds past the first position on the first coordinated path;
 before the second robotic device has reached the second position on the second coordinated path, determine a first traversable portion of the first coordinated path, wherein the first traversable portion extends to the first position on the first coordinated path when a distance between the first robotic device and the first position is less than a maximum length limit;
 provide a first instruction to the first robotic device to traverse the first traversable portion of the first coordinated path;
 subsequently determine that the second robotic device has passed the second position on the second coordinated path;
 after the second robotic device has passed the second position on the second coordinated path, determine a second traversable portion of the first coordinated path, wherein the second traversable portion has a length equal to the maximum length limit; and
 provide a second instruction to the first robotic device to traverse the second traversable portion of the first coordinated path.

11. The system of claim 10, wherein the maximum length limit is based on a length of the first coordinated path that is traversable in a predetermined time unit.

12. The system of claim 10, further comprising a path planning system, wherein the computing device is configured to receive the first and second coordinated paths from the path planning system, and wherein the computing device is further configured to:
 determine that the first robotic device is behind schedule by more than a threshold amount; and
 responsive to determining that the first robotic device is behind schedule by more than the threshold amount, request updated first and second coordinated paths from the path planning system.

13. The system of claim 12, wherein the computing device is further configured to:
 receive updated first and second coordinated paths from the path planning system; and
 provide a plurality of instructions to the first robotic device to traverse a plurality of traversable portions of the first coordinated path during a time between the computing device requesting and receiving updated first and second coordinated paths from the path planning system.

14. A non-transitory, computer-readable medium having instructions stored thereon that when executed by at least one processor, cause the at least one processor to perform a set of acts comprising:
 receiving first and second coordinated paths for respective first and second robotic devices, wherein the first coordinated path comprises a first dependency edge indicating a first position on the first coordinated path and a second position on the second coordinated path, wherein the second position on the second coordinated path is to be reached by the second robotic device before the first robotic device proceeds past the first position on the first coordinated path;

before the second robotic device has reached the second position on the second coordinated path, determining a first traversable portion of the first coordinated path, wherein the first traversable portion extends to the first position on the first coordinated path when a distance between the first robotic device and the first position is less than a maximum length limit;

providing a first instruction to the first robotic device to traverse the first traversable portion of the first coordinated path;

subsequently determining that the second robotic device has passed the second position on the second coordinated path;

after the second robotic device has passed the second position on the second coordinated path, determining a second traversable portion of the first coordinated path, wherein the second traversable portion has a length equal to the maximum length limit; and providing a second instruction to the first robotic device to traverse the second traversable portion of the first coordinated path.

15. The non-transitory, computer-readable medium of claim 14, wherein the maximum length limit is based on a length of the first coordinated path that is traversable in a predetermined time unit.

16. The non-transitory, computer-readable medium of claim 14, wherein the first and second coordinated paths are received from a path planning system, the set of acts further comprising:

determining that the first robotic device is behind schedule by more than a threshold amount; and responsive to determining that the first robotic device is behind schedule by more than the threshold amount, requesting updated first and second coordinated paths from the path planning system.

17. The non-transitory, computer-readable medium of claim 16, the set of acts further comprising:

receiving updated first and second coordinated paths from the path planning system; and providing a plurality of instructions to the first robotic device to traverse a plurality of traversable portions of the first coordinated path during a time between requesting and receiving updated first and second coordinated paths from the path planning system.

* * * * *